US010871187B2

(12) United States Patent
Walling et al.

(10) Patent No.: US 10,871,187 B2
(45) Date of Patent: Dec. 22, 2020

(54) GLIDE BEARING ARRANGEMENT FOR TELESCOPING SUPPORT COLUMNS

(71) Applicant: OMT-VEYHL USA CORPORATION, Holland, MI (US)

(72) Inventors: Mark Joseph Walling, Norton Shores, MI (US); Scott Boboltz, Allendale, MI (US)

(73) Assignee: OMT-VEHYL USA CORPORATION, Holland, MI (US)

( * ) Notice: Subject to any disclaimer, the term of this patent is extended or adjusted under 35 U.S.C. 154(b) by 0 days.

(21) Appl. No.: 16/668,625

(22) Filed: Oct. 30, 2019

(65) Prior Publication Data
US 2020/0132116 A1 Apr. 30, 2020

Related U.S. Application Data

(60) Provisional application No. 62/753,384, filed on Oct. 31, 2018.

(51) Int. Cl.
*F16C 29/02* (2006.01)
*A47B 9/20* (2006.01)

(52) U.S. Cl.
CPC ............... *F16C 29/02* (2013.01); *A47B 9/20* (2013.01); *A47B 2200/002* (2013.01); *A47B 2200/0052* (2013.01)

(58) Field of Classification Search
CPC .... F16C 29/002; F16C 29/02; F16C 2314/70; A47B 9/20; A47B 2200/0051; A47B 2200/0052; F16B 7/1445; F16B 7/1463; F16B 7/149
See application file for complete search history.

(56) References Cited

U.S. PATENT DOCUMENTS 9,629,452 B1 * 4/2017 Chen ................... F16C 29/02
10,226,119 B1 * 3/2019 Ko ........................ A47B 9/20

FOREIGN PATENT DOCUMENTS

| EP | 3217023 A1 * | 9/2017 | ............. F16M 11/32 |
| EP | 3302178 B1 * | 3/2020 | ............. F16C 33/208 |
| WO | WO-9516145 A1 * | 6/1995 | ............. B66C 23/707 |
| WO | WO-2019038095 A1 * | 2/2019 | ............. F16C 3/035 |

* cited by examiner

*Primary Examiner* — Phillip A Johnson
(74) *Attorney, Agent, or Firm* — Barnes & Thornburg LLP

(57) ABSTRACT

A glide bearing for guiding axial movement between inner and outer telescoping columns may include first and second spaced apart contact surfaces, and a resilient wall extending therebetween and having an outer convex surface defining an apex. A span between the apex and a plane defined between the first and second contact surfaces is greater than a width of a space between the outer surface of the inner column and the inner surface of the outer column. The glide bearing is configured to be disposed within the space with the first and second contact surfaces contacting the outer surface of the inner column, with the apex contacting the inner surface of the outer column and with the resilient wall deflecting inwardly toward the plane to accommodate the space in response to a force of the inner surface of the outer column acting against the apex.

27 Claims, 12 Drawing Sheets

GLIDE BEARING ARRANGEMENT FOR TELESCOPING SUPPORT COLUMNS

CROSS-REFERENCE TO RELATED APPLICATION

This patent application claims the benefit of, and priority to, U.S. Provisional Patent Application Ser. No. 62/753,384, filed Oct. 31, 2018, the disclosure of which is expressly incorporated herein by reference in its entirety.

FIELD OF THE INVENTION

The present invention relates generally to telescoping support columns, and more specifically to bearings for guiding relative axial movement between the support columns.

BACKGROUND

Telescoping columns are employed in myriad products and applications including, for example, height adjustable work stations. Conventional telescoping columns typically include two or more elongated columns each with sequentially increasing or decreasing cross-sectional area, and with each such column successively received axially within an adjacent column of greater cross-sectional area. Such telescoping columns are typically raised and lowered manually via a manually-actuated mechanism and/or automatically via one or more electrically-driven motors or via a hydraulic or pneumatic drive mechanism. One or more bearings are typically used between such telescoping columns to guide axial movement of the columns relative to one another.

SUMMARY

The present disclosure may comprise one or more of the features recited in the attached claims, and/or one or more of the following features and combinations thereof. In a first aspect, a glide bearing is provided for guiding relative axial movement between inner and outer telescoping columns. The guide bearing may comprise a first contact surface, a second contact surface spaced apart from the first contact surface, the first and second contact surfaces together defining a first plane, and a first resilient wall extending between the first and second contact surfaces and having an outer convex surface, opposite the first and second contact surfaces, defining a first apex, the glide bearing defining a span between the first plane and the first apex that is greater than a width of a space defined between the inner and outer columns, the glide bearing configured to be disposed within the space with the first and second contact surfaces contacting one of the inner and outer columns, with the first apex contacting the other of the inner and outer columns and with the first resilient wall deflecting inwardly toward the first plane to accommodate the space in response to a force of the other of the inner and outer columns acting against the first apex. At least the first apex of the outer convex surface may form a bearing surface to guide relative axial movement between inner and outer telescoping columns.

In a second aspect, a glide bearing arrangement is provided for telescoping columns, and may comprise an inner elongated support column having an outer surface, an outer elongated support column having an inner surface, the outer column axially receiving the inner column therein with a space defined about the inner column between the outer surface of the inner column and the inner surface of the outer column, and a plurality of inner glide bearings mounted to and about the inner column adjacent to or spaced apart from one end thereof, each of the plurality of inner glide bearings including a first contact surface in contact with the outer surface of the inner column, a second contact surface in contact with the outer surface of the inner column, the second contact surface spaced longitudinally apart from the first contact surface relative to the outer surface of the inner column, and a first resilient wall extending between the first and second contact surfaces and having an outer convex surface, opposite the first and second contact surfaces, defining a first apex, the inner glide bearing defining a span between the first apex and a first plane defined by the first and second contact surfaces that is greater than a width of the space defined between the inner and outer columns, the inner glide bearing disposed within the space with the first and second contact surfaces contacting the outer surface of the inner column, with the first apex contacting the inner surface of the outer column and with the first resilient wall deflecting inwardly toward the outer surface of the inner column to accommodate the space as a force of the inner surface of the outer column acts against the first apex. At least the first apex of the outer convex surface of the inner glide bearing may form a first bearing surface to guide relative axial movement between inner and outer telescoping columns.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

DETAILED DESCRIPTION OF THE DRAWING

Figure 1:
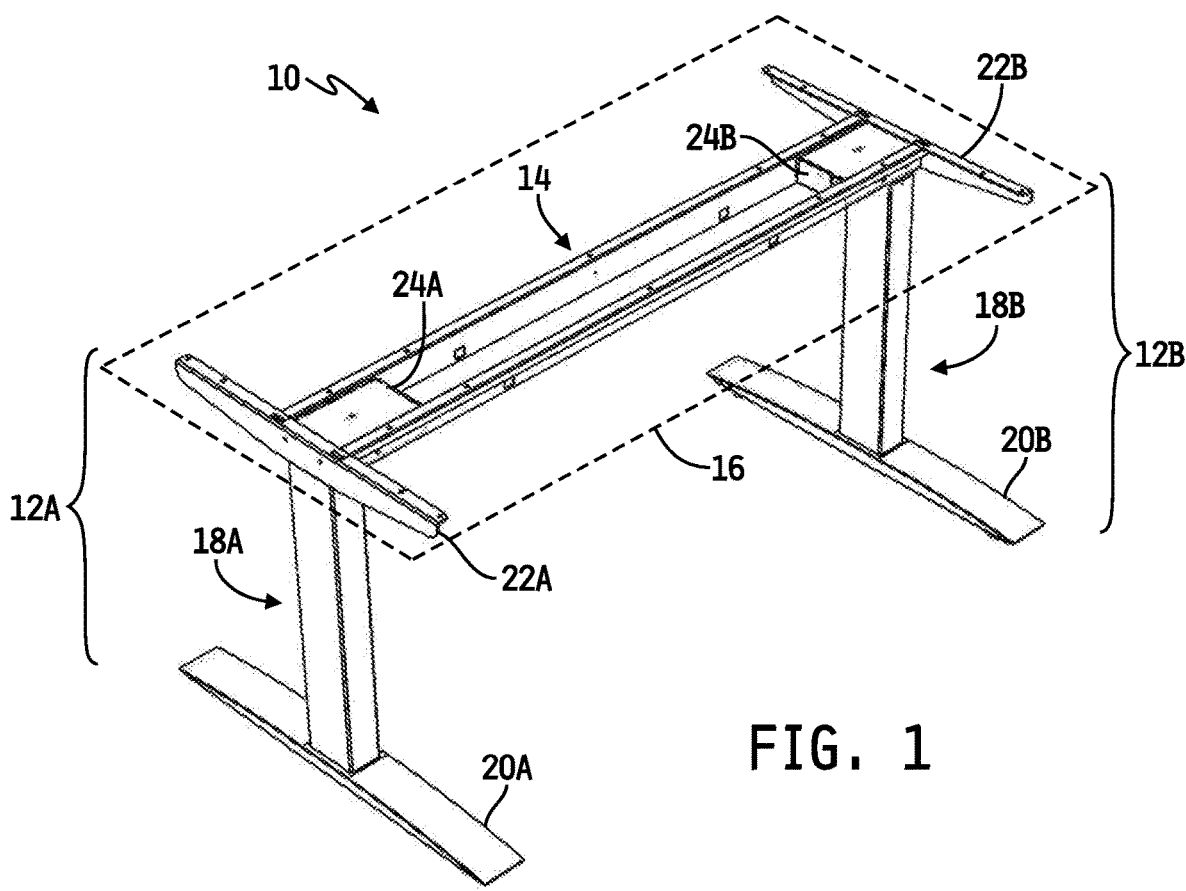
FIG. 1 is a simplified perspective view of a height-adjustable work table including two height-adjustable supports.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Referring now to FIG. 1, a simplified perspective view is shown of a height-adjustable work table 10 including two height-adjustable supports 18A, 18B, each of which incorporate embodiments of glide bearings as will be described in detail herein. The height-adjustable table 10 illustratively includes two vertical supports 12A, 12B coupled together via an axial support 14 and a work surface 16, e.g., a table or other work surface, positioned on and supported by the supports 12A, 12B and 14. In the illustrated embodiment, each vertical support includes a height-adjustable support 18A, 18B coupled at a lower end to a respective lateral or transverse base member 20A, 20B supported on and by a support surface, e.g., a floor. Upper ends of the height-adjustable supports 18A, 18B are coupled to respective lateral or transverse table support members 22A, 22B. The lateral table support members 22A, 22B are, in turn, coupled to respective ends of the axial support 14, and the work surface 16 is supported on and by the lateral support members 22A, 22B and the axial support 14.

In the illustrated embodiment, motor boxes 24A, 24B are shown coupled to the axial support 14 and to the upper ends of the height-adjustable support 18A, 18B respectively. In this embodiment, height adjustment of the height-adjustable supports 18A, 18B is motor driven, and each support 18A, 18B is operatively coupled to a respective drive motor (not shown) carried within a respective one of the motor boxes 24A, 24B. In alternate embodiments, the height-adjustable supports 18A, 18B may be manually adjustable, and in such embodiments the motor boxes 24A, 24B may be omitted.

Figure 2:
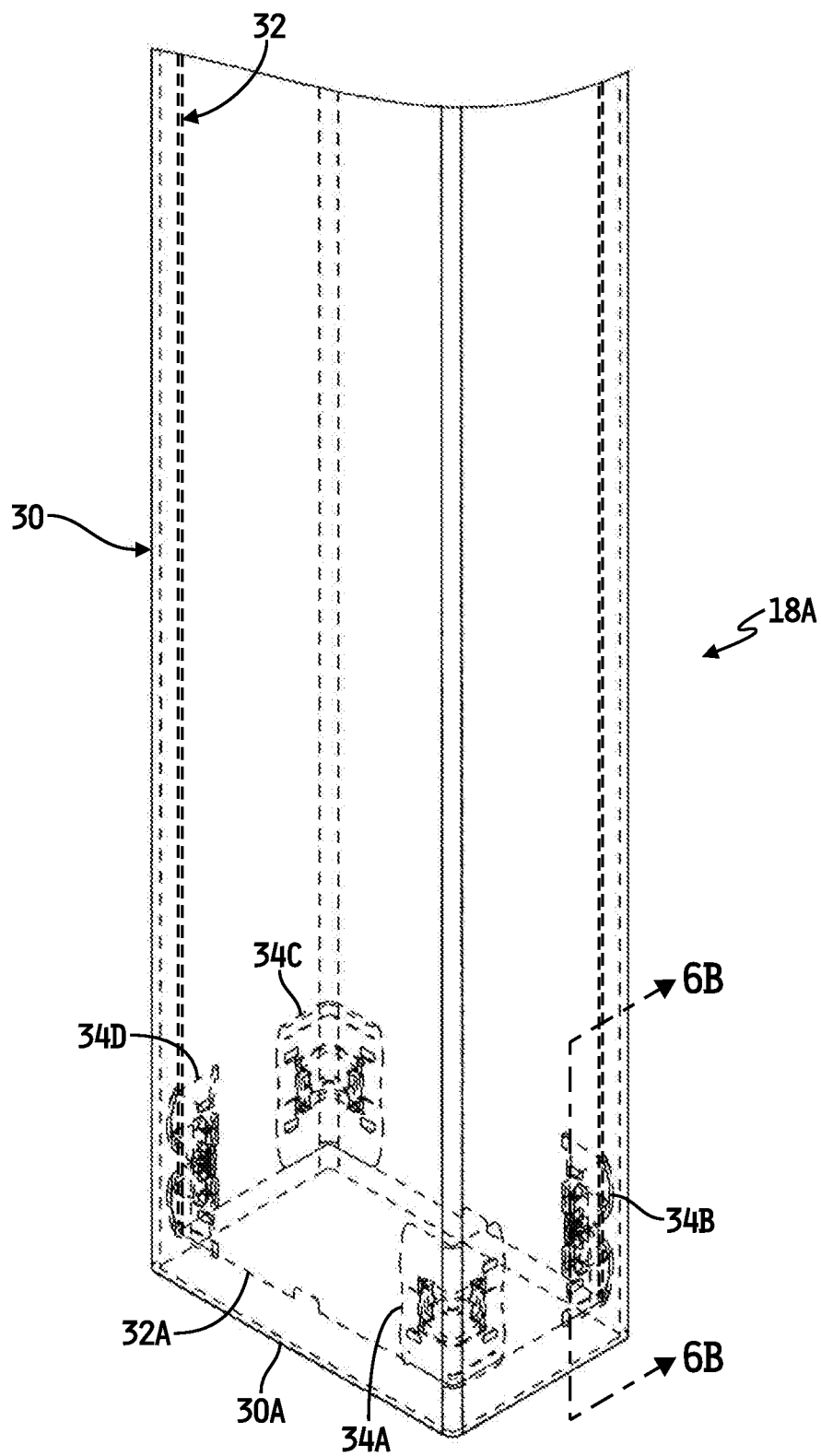
FIG. 2 is a simplified perspective view of a portion of one of the height-adjustable, supports of FIG. 1 including a lower part of an inner column, shown in dashed-line representation, axially received within a lower part of an outer column, shown in solid-line representation, wherein the inner and outer columns are compressed together to a minimum total height of the height-adjustable support.

Referring now to FIG. 2, a lower portion of one of the height-adjustable, supports 18A is shown. In the illustrated embodiment, the height-adjustable support 18A includes an elongated outer support column 30 having a lower end 30A (shown in solid-line representation) and an elongated inner support column 32 having a lower end 32A (shown in dashed-line representation). The inner support column 32 is axially received within the outer support column 30, and in FIG. 2 the height-adjustable support 18A is shown completely compressed or recessed to a minimum total height of the height-adjustable support 18A. In this state or configuration, the lower end 32A of the inner column 32 is illustratively adjacent to the lower end 30A of the outer column 30. In alternate embodiments, the lower end 32A of the inner column 32 may be spaced apart from the lower end 30A of the outer column in the completely compressed or telescoped configuration. In one embodiment, the outer support column 30 is stationary and the inner support column 32 moves axially within and relative to the outer column 30 to raise and lower the height-adjustable supports 18A, 18B. In alternate embodiments, the inner support column 32 may be configure to remain stationary and the outer support column 30 may move axially along the inner support column 32 to raise and lower the height-adjustable supports 18A, 18B.

Figure 3A:
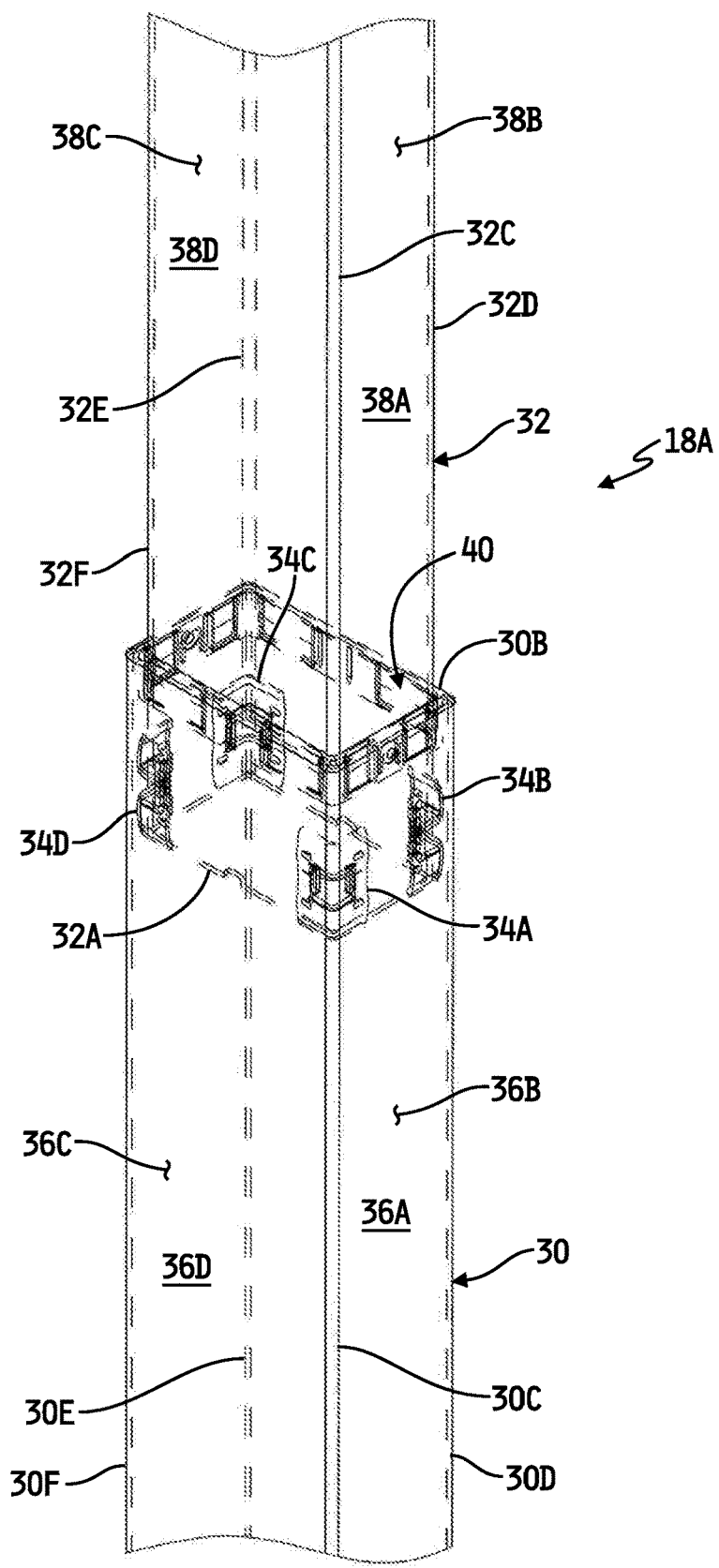
FIG. 3A is a simplified perspective view of another portion of the height-adjustable support of FIG. 2 in which the inner and outer columns are expanded to a maximum total height of the height-adjustable support.
Figure 3B:
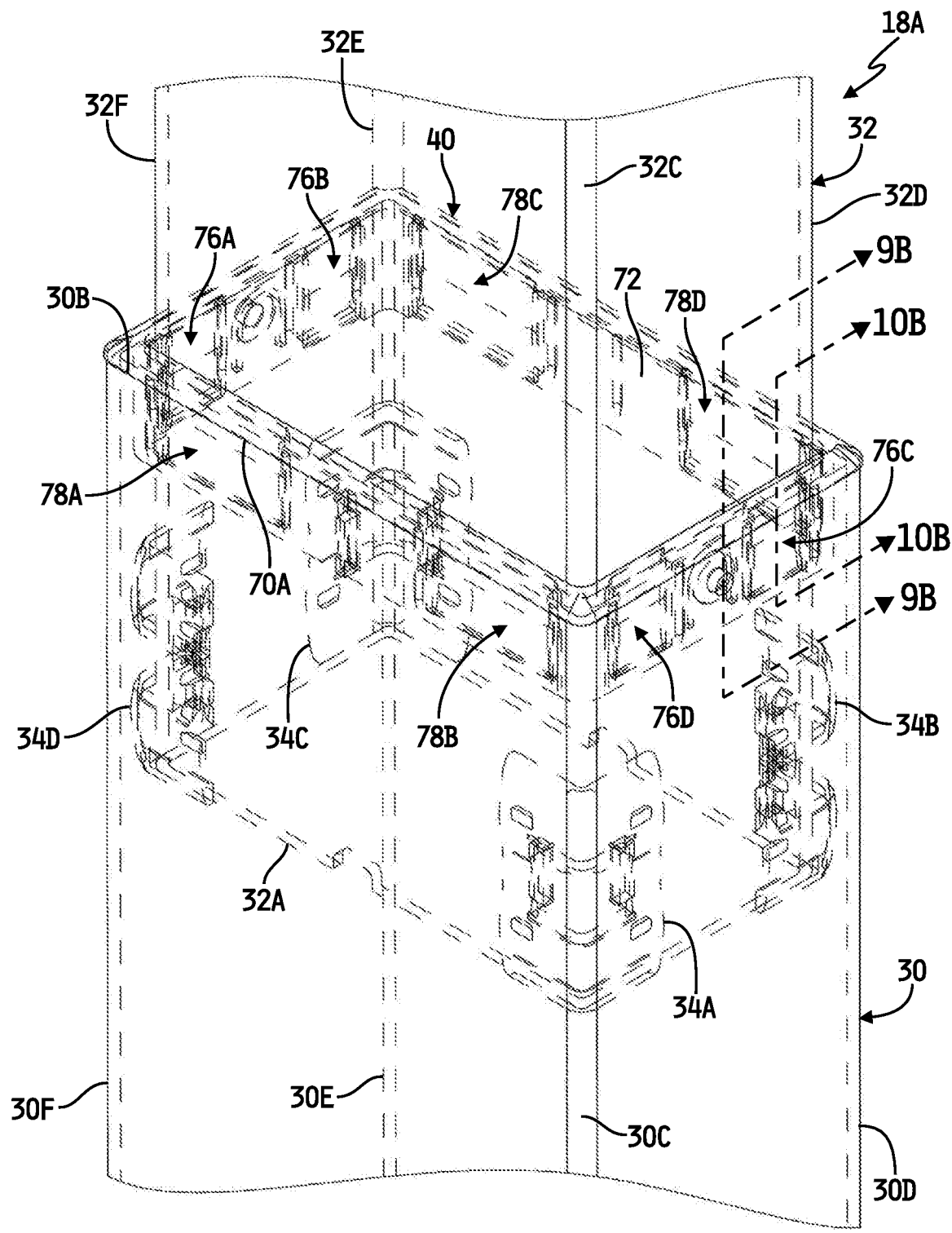
FIG. 3B is a magnified view of the middle section of the height-adjustable support illustrated in FIG. 3A.

Referring now to FIGS. 3A and 3B, another portion of the height-adjustable support 18A is shown. In FIGS. 3A and 3B, the height-adjustable support 18A is shown completely expanded or telescoped to a maximum total height of the height-adjustable support 18A. In this state or configuration, the lower end 32A of the inner column 32 is illustratively contained within the outer column 30 and is spaced apart from the upper end 30B of the outer column 30. The distance between the upper end 30B of the outer column 30 and the lower end 32A of the inner column 32 in the completely expanded state of the height-adjustable support 18A is illustratively selected to accommodate, e.g., within a safe margin, geometries of various glide bearings coupled to the inner and outer columns 32, 30. In alternate embodiments, the distance between the upper end 30B of the outer column 30 and the lower end 32A of the inner column 32 in the completely expanded state of the height-adjustable support 18A may be greater such that the lower end 32A of the inner column 32 descends further into the outer column 30 than shown in FIGS. 3A and 3B.

In the embodiment depicted in the attached drawings, the inner and outer columns 32, 30 are illustratively rectangular in cross-section. As illustrated in FIGS. 3A and 3B, for example, the outer support column 30 has four elongated, planar sides 36A-36D with "soft" (e.g., rounded) right-angled corners 30C-30F between adjacent side pairs. Likewise, the inner column 32 has four elongated planar sides 38A-38B with soft right-angled corners 32C-32F between adjacent side pairs. The cross-sectional profile of the columns 30, 32 are identical, although the cross-sectional area of the inner column 32 is less than that of the outer column so that the inner column 32 can be axially received within the outer column 30 as shown. It will be understood, however, that the columns 30, 32 need not be rectangular in cross-section but may instead be designed to have any desired polygonal shape with two or more sides, one or more or all of which may be planar as in the illustrated embodiment or non-planar, and one or more corresponding corners, wherein any of the corners may define an angle between adjacent sides that is an acute angle, a right angle or an obtuse angle. Alternatively, the columns 30, 32 may have only a single, continuous side with no corners. Example cross-sections of such single-side, corner-less columns 30, 32 may include, but are not limited to, circular, oval, elliptical, egg-shaped and the like. Moreover, although the height-adjustable support 18A is depicted in the attached figures as including only two nesting or telescoping support columns, those skilled in the art will recognize that the concepts illustrated in the attached figures and described herein are directly applicable to height-adjustable supports having more than two such telescoping support columns.

Regardless of the cross-sectional shapes of the inner and outer columns 32, 30, the height adjustable support columns 18A, 18B illustratively include a plurality of, i.e., two or more, inner glide bearings coupled to and about the inner column 32 and a plurality of, i.e., two or more, outer glide bearings coupled to an about the outer column 30. In the illustrated embodiment in which the inner and outer columns 32, 30 are rectangular in cross-section, the inner glide bearings are illustratively provided in the form of four inner glide bearings 34A-34D, each configured to span one of the corners 32C-32F and couple to adjacent sides 38A-38D of the inner column 32 as shown in FIGS. 2-3B. A detailed description of the structure and function of one embodiment of the inner glide bearings 34A-34D is provided below with respect to FIGS. 4A-6B. The outer glide bearings are illustratively provided in the form of a glide bushing 40 including a rectangular bushing ring 72 coupled to the outer column 30 and carrying eight outer glide bearings 76A-76D and 78A-78D. As illustrated by example in FIGS. 3A and 3B, two of the glide bearings 76A, 76B are positioned in contact with the side 36C of the outer column 30, two 76C, 76D are positioned in contact with the side 36A, two 78A, 78B are positioned in contact with the side 36D and two 78C, 78D are positioned in contact with the side 36B. A detailed description of the structure and function of one embodiment of the glide bushing 40 and of the outer glide bearings 76A-76D and 78A-78D is provided below with respect to FIGS. 7A-10B.

Figure 4A:
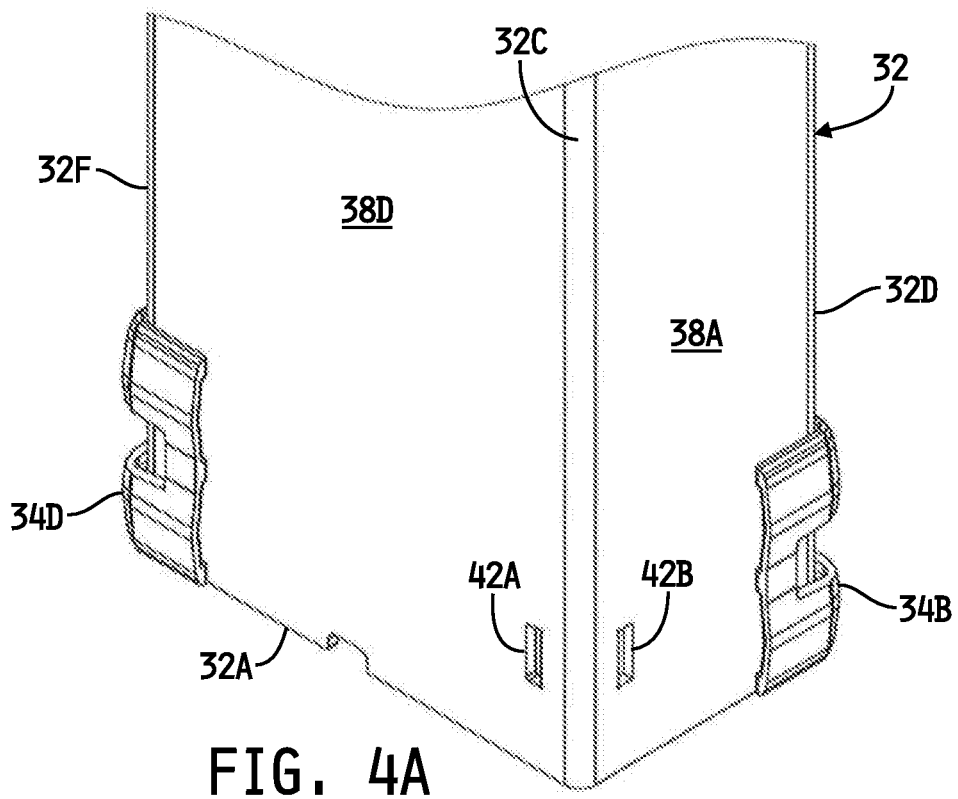
FIG. 4A is a simplified perspective view of the lower portion of the inner column of FIG. 2 shown in isolation with two inner glide bearings coupled to the inner column and with one inner glide bearings removed to illustrate an embodiment of the inner column configured to couple the missing inner glide bearing thereto.
Figure 4B:
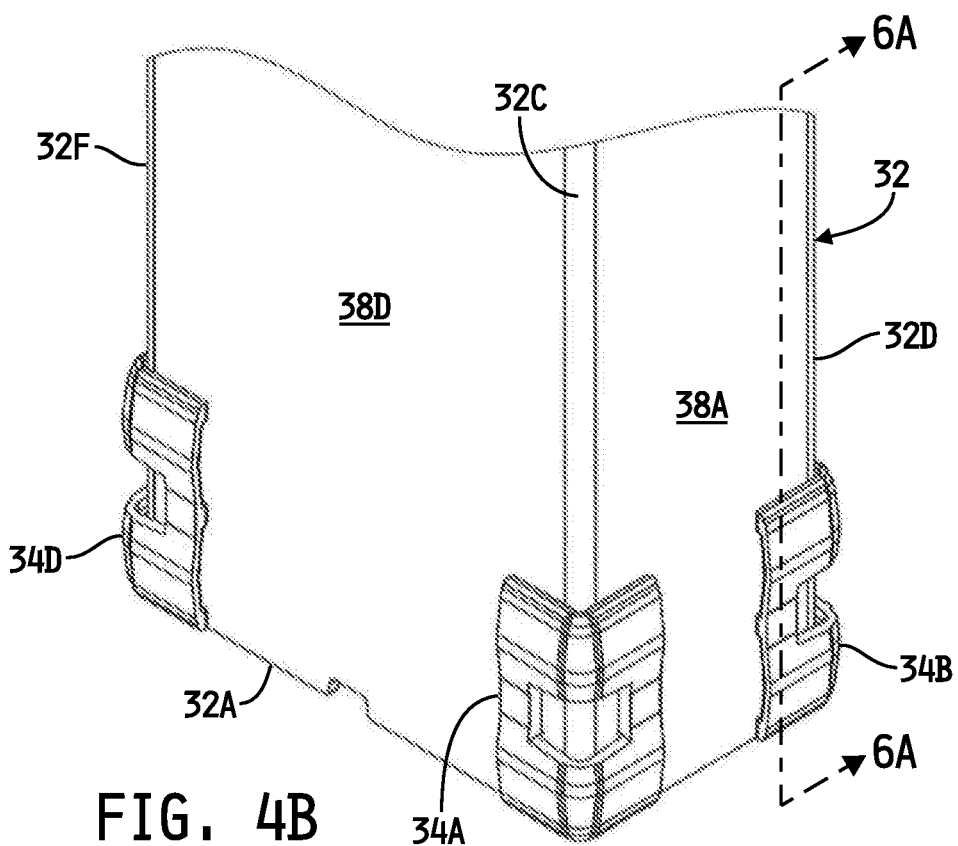
FIG. 4B is a simplified perspective view similar to FIG. 4A but with the inner glide bearing missing from FIG. 4A now coupled to the inner column.

Referring now to FIGS. 4A and 4B, the inner glide bearings 34A-34D are shown coupled to the inner column 32 adjacent to the bottom end 32A thereof. In some alternate embodiments, the inner glide bearings 34A-34D may be spaced apart from the bottom end 32A of the inner column 32, and in other alternate embodiments two or more axially spaced sets of the inner glide bearings 34A-34D may be coupled to the inner column 32. In the illustrated embodiment, two axially aligned slots 42A, 42B are formed in each of the walls 38A-38D of the inner column 32 on either side of each of the corners 32C-32F and spaced apart from the bottom end 32A of the inner column (only two such slots 42A, 42B formed in the walls 38D and 38A respectively are shown in FIG. 4A). Each of the inner glide bearings 34A-34D includes two corresponding tabs 58A, 58B sized and configured to be received within the slots 42A, 42B to couple the inner glide bearings 34A-34D to the inner column 32. In the illustrated embodiment, the slots 42A, 42B are spaced apart from the bottom end 32A such that, when the inner glide bearings 34A-34D are coupled to the inner column 32, the bottom ends of the inner glide bearings 34A-34D terminate at, i.e., are co-planar with, the bottom end 32A of the inner column 32 (as illustrated by example in FIGS. 6A and 6B). In alternate embodiments, the slots 42A, 42B may be positioned relative to the bottom end 32A of the inner column 32 such that the bottom ends of the inner glide bearings 34A-34D are spaced apart from the bottom end 32A of the inner column 32 by some desired distance.

Referring now to FIGS. 5A-5D, an embodiment is shown of one of the inner glide bearings 34A illustrated in FIGS. 2-3B. In the illustrated embodiment, the inner glide bearings 34A-34D are identical to one another, and the follow description therefore should be understood to apply equally to each of the remaining inner glide bearings 34B-34D. In alternate embodiments, one or more of the inner glide bearings 34A-34D may be sized and/or configured differently from others of the inner glide bearings 34A-34D.

In the embodiment illustrated in FIGS. 5A-5D, the illustrated glide bearing 34A has a top 44A, a bottom 44B opposite the top 44A, a first side 46A and a second side 46B opposite the first side 46A. A first elongated wing 48A is coupled to a second elongated wing 48B via a corner member 48C. The first wing 48 has an inwardly facing inner surface 48A1 and an outwardly facing outer surface 48A2 opposite the inwardly facing surface 48A1, and the second wing 48B likewise has an inwardly facing inner surface 48B1 and an outwardly facing outer surface 48B2 opposite the inwardly facing inner surface 48B1. The first wing 48A defines a length between the top 44A and bottom 44B thereof, and a width between the first side 46A and an imaginary line L which extends axially and centrally through the corner member 48C. The second wind 48B likewise defines a length between the top 44A and the bottom 44B thereof, and a width between the second side 46B and the axial line L. In the illustrated embodiment, the structures of the first and second wings 48A, 48B are identical to one another, although in alternate embodiments the structure of the first wing 48A may be different from the structure of the second wing 48B.

The inwardly facing inner surface 48A1 of the first wing 48A illustratively defines a planar elongated contact surface 50A extending the width of the first wing 48A adjacent to the top 44A thereof. Another planar contact surface 50B defined by the inner surface 48A1 of the first wing 48A is longitudinally spaced apart from the contact surface 50A and is positioned adjacent to the first side 46A. The contact surface 50B does not extend the full width of the first wing 48A but instead terminates at an elongated inner column engaging tab 58A defined by the inner surface 48A1 of the first wing 48A. The inner elongated column engaging tab 58A is axially oriented parallel with the first side 46A, is offset from the first side 46A by a width of the contact surface 50B and is axially positioned centrally between the top 44A and bottom 44B of the first wing 48A. The inwardly facing inner surface 48A1 of the first wing 48A illustratively defines yet another planar elongated contact surface 50C extending the width of the first wing 48A adjacent to the bottom 44A thereof and longitudinally spaced apart from the contact surface 50B by the same distance separating the contact surfaces 50A and 50B. The planar contact surfaces 50A-50C are co-planar with one another and illustratively define a common plane P1 as illustrated by example in FIG. 5D.

The inwardly facing inner surface 48B1 of the second wing 48B likewise illustratively defines three planar contact surfaces 50D, 50E and 50F and an inner column coupling tab 58B all identically as described with reference to the three planar contact surfaces 50A, 50B and 50C and the inner column coupling tab 58A respectively. The planar contact surfaces 50D-50F are co-planar with one another and illustratively define another common plane P2 as also illustrated by example in FIG. 5D. The two planes P1 and P2, and thus the two wings 48A, 48B, define an angle A therebetween as depicted in FIG. 5D. In the illustrated embodiment, the angle A is illustratively a right angle, i.e., 90 degrees, although in other embodiments the angle A may be an acute angle or an obtuse angle. A central void or opening 55 is defined between the inner column coupling tabs 58A, 58B which is bounded by upper and lower sections 48C1 and 48C2 respectively of the corner member 48C.

The first wing 48A illustratively defines a resilient wall 52A which extends between the contact surfaces 50A and 50B, and another resilient wall 52B which extends between the contact surfaces 50B and 50C. The resilient walls 52A and 52B are generally convexly shaped in cross-section away from the plane P1 as most clearly illustrated in FIGS. 5B and 5D. The resilient wall 52A has an outer convex surface 52A1 which forms part of the outer surface 48A2 of the wing 48A, and an inner convex surface 52A2 which forms part of the inner surface 48A1 of the wing 48A. The convex shape of the outer surface 52A1 of the resilient wall 52A peaks at an apex 54A, and the wing 48A defines a span S between the apex 54A and the plane P1 defined by the planar contact surfaces 50A and 50B. A stop member 56A extends from the inner convex surface 52A2 of the resilient wall 52A and terminates at a stop surface 56A1 facing and spaced apart from the plane P1. Illustratively, the stop member 56A extends from a portion or area of the inner convex surface 52A2 opposite the apex 54A.

The resilient wall 52B likewise has an outer convex surface 52B1 which forms part of the outer surface 48B2 of the wing 48B, and an inner convex surface 52B2 which forms part of the inner surface 48B1 of the wing 48B. The convex shape of the outer surface 52B1 of the resilient wall 52B similarly peaks at an apex 54B, and the span S is similarly defined between the apex 54B and the plane P1 defined by the planar contact surfaces 50B and 50C. A stop member 56B extends from the inner convex surface 52B2 of the resilient wall 52B and terminates at a stop surface 56B1 facing and spaced apart from the plane P1. Illustratively, the stop member 56B extends from a portion or area of the inner convex surface 52B2 opposite the apex 54B.

Figure 5A:
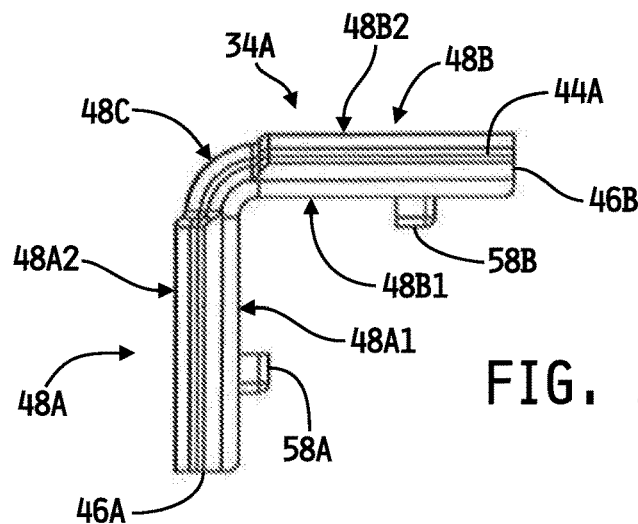
FIG. 5A is a top plan view of an embodiment of one of the inner glide bearings illustrated in FIGS. 2-4B.
Figure 5B:
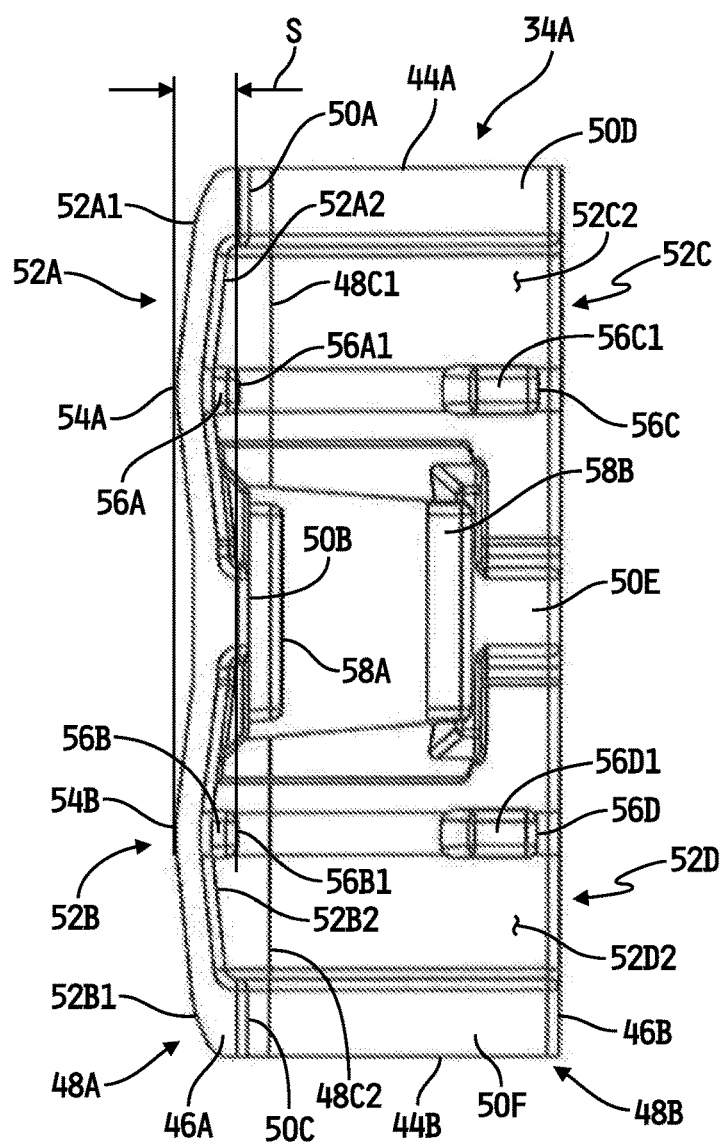
FIG. 5B is a perspective view of the inner glide bearing of FIG. 5A.
Figure 5C:
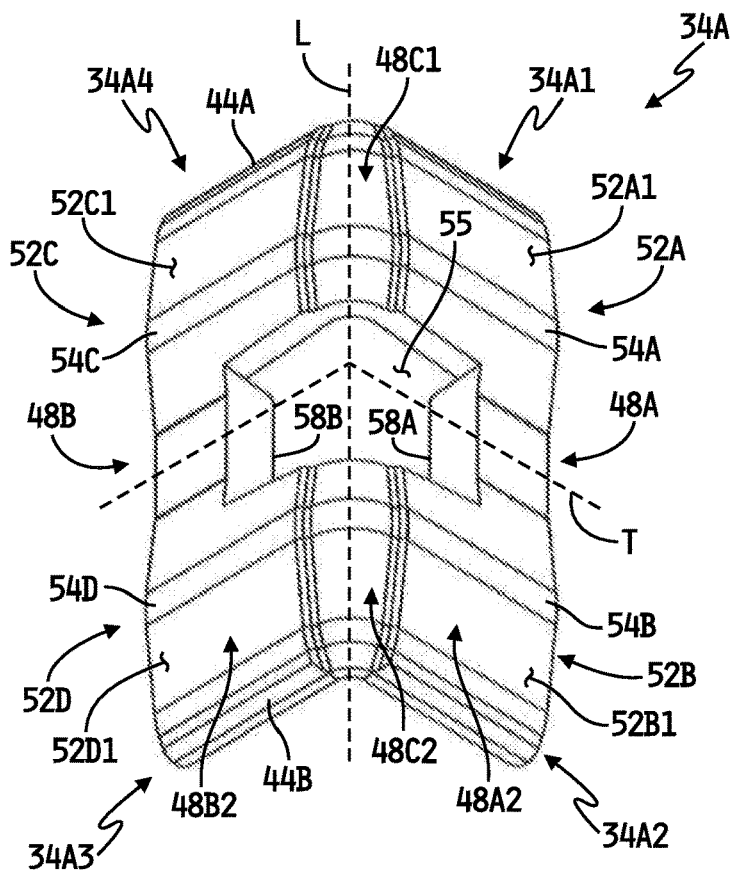
FIG. 5C is a plan view of the outer surface of the inner glide bearing of FIGS. 5A and 5B.
Figure 5D:
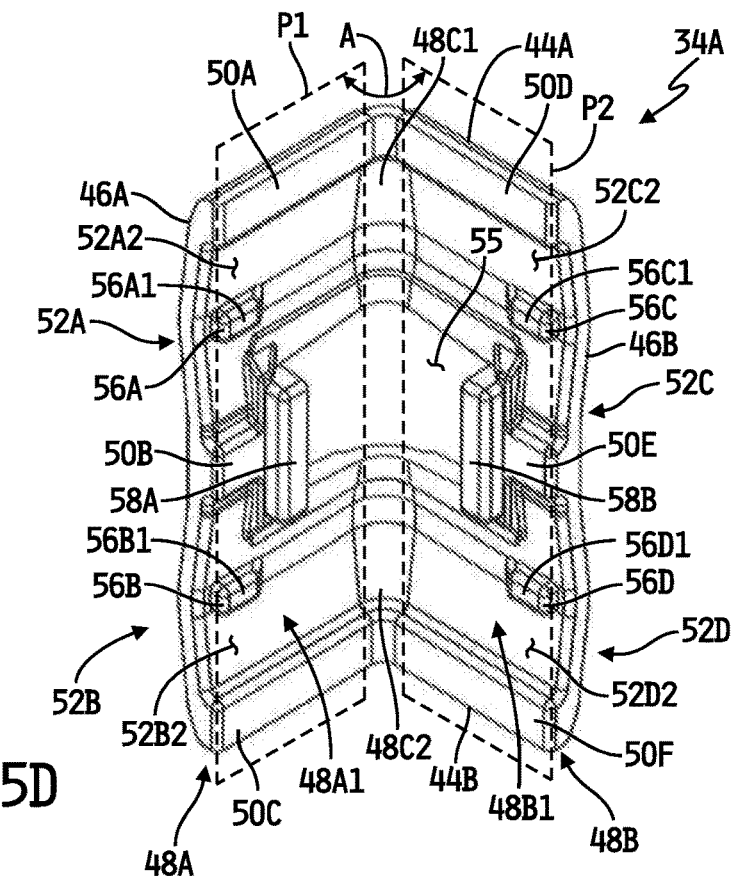
FIG. 5D is a plan view of the inner surface of the inner glide bearing of FIGS. 5A-5C.

The second wing 48B likewise illustratively defines resilient walls 52C, 52D which extend between the contact surfaces 50D and 50E and the contact surfaces 50E and 50F respectively, which are generally convexly shaped in cross-section away from the plane P2 as most clearly illustrated in FIGS. 5B and 5D. The resilient walls 52C, 52D have an outer convex surfaces 52C1, 52D1 which form part of the outer surface 48B2 of the wing 48B, and an inner convex surfaces 52C2, 52D2 which form part of the inner surface 48B1 of the wing 48B. The convex shapes of the outer surfaces 52C1, 52D1 of the resilient walls 52C, 52D peak at respective apices 54C, 54D, and the wing 48B defines the span S between each of the apices 54C, 54D and the plane P2 defined by the planar contact surfaces 50D-50F. Stop members 56C, 56D extend from the inner convex surfaces 52B2, 52C2 of the respective resilient walls 52C, 52D and terminate at respective stop surfaces 56C1, 56D1 each facing and spaced apart from the plane P2. Illustratively, the stop members 56C, 56D each extend from a portion or area of the respective inner convex surface 52C2, 52D2 opposite the respective apex 54C, 54D.

The resilient convex walls 52A-52D of the inner glide bearing 34A are illustratively biased outwardly away from the respective planes P1 and P2. Each resilient wall 52A-52D is deflectable inwardly toward a respective one of the planes P1, P2 in response to a force above a threshold force acting against its convex surface generally and against its respective apex 54A-54D in particular. As it is being deflected inwardly under such force, however, the resilient property of each resilient wall 52A-52D continues to bias the wall 52A-52D outwardly away from the respective plane P1, P2 and toward the respective apex 54A-54C. As such, each resilient wall 52A-52D acts as a spring biased away from the respective plane P1, P2 and focused in the direction of the respective apex 54A-54D.

It will be understood that the term "apex" is used herein only to identify the peak outer surface of each of the resilient walls 52A-52D, and is not limited to sharp or pointed structures. Rather, it will be understood that any "apex" identified herein may range from a gradually rounded "soft" peak in some embodiments to a sharp or pointed peak structure in other embodiments, and should further be understood to include any variant therebetween. In any case, as illustrated most clearly in FIG. 5C, each apex 54A-54D illustratively extends across the width of a respective one of the outer surfaces 52A1-52D1 of a respective one of the resilient walls 52A-52D, although in alternate embodiments one or more of the apices 54A-54D may extend from a respective side 46A, 46B only partially across the width of a respective one of the outer surfaces 52A1-52D1.

In the illustrated embodiment, each inner glide bearing 34A-34D is of uniform construction, and in one embodiment each is illustratively formed of a conventional lubrication-free tribo-polymer or tribo-plastic material. Alternatively one or more other conventional bearing materials, such as one or more conventional low-friction materials, may be used to form the inner glide bearings 34A-34D. In alternate embodiments, one or more components of one or more of the inner glide bearings 34A-34D may be formed separately from the others and attached, affixed or otherwise mounted together after formation. In such embodiments, any combination of the components of any one or more of the inner glide bearings 34A-34D may be formed together as a single, unitary sub-component, and the remaining component(s) may be formed separately. Such components may then be joined together in any conventional manner to produce one or more of the inner glide bearings 34A-34D.

Figure 6A:
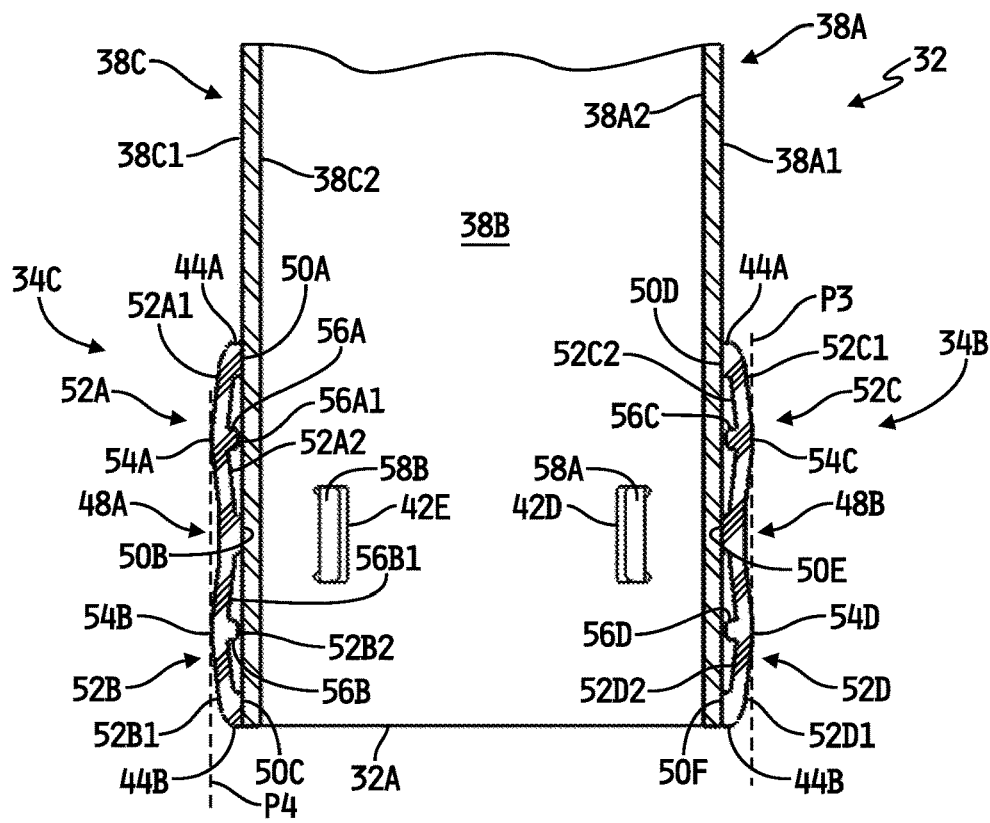
FIG. 6A is a cross-sectional view of the inner column of FIGS. 4A and 4B, as viewed along section lines 6A-6A of FIG. 4B, showing coupling of two of the inner glide bearings to the inner column.

Referring now to FIG. 6A, a cross-sectional view is shown depicting two of the inner glide bearings 34B and 34C coupled to corresponding sides 38A, 38B and 38C, 38B respectively of the inner support column 32. The planar side wall 38A of the inner column 32 has opposed outer and inner surfaces 38A1, 38A2 respectively, and the planar side wall 38C of the inner column 32 likewise has opposed outer and inner surfaces 38C1, 38C2. The inner column coupling tab 58A of the wing 48A of the inner glide bearing 34B is shown extending into the slot 42D formed through the wall 38B adjacent to the corner 32D of the inner column 32, and the other wing 48B of the inner glide bearing 34B is shown in contact with the outer surface 38A1 of the planar side wall 38A of the inner column 32. The inner column coupling tab 58B of the wing 48B of the inner glide bearing 34C is likewise shown extending into the slot 42E of formed through the wall 38B adjacent to the corner 32E of the inner column 32, and the other wing 48A of the inner glide bearing 34C is shown in contact with the outer surface 38C1 of the planar side wall 38C of the inner column 32. As illustrated in FIG. 6A, the contact surfaces 50D, 50E and 50F of the inner glide bearing 34B are in contact with the planar outer surface 38A1 of the side wall 38A of the inner column 32, and the contact surfaces 50A, 50B and 50C of the inner glide bearing 34C are in contact with the planar outer surface 38C1 of the side wall 38C of the inner column 32. The inner convex surfaces 52C2 and 52D2 of the respective resilient walls 52C and 52D of the inner glide bearing 34B are spaced apart from the outer surface 38A1 of the side wall 38A of the inner column 32, as are the stop surfaces of the respective stop members 56C, 56D. The inner convex surfaces 52A2 and 52B2 of the respective resilient walls 52A and 52B of the inner glide bearing 52A are likewise spaced apart from the outer surface 38C1 of the side wall 38C of the inner column 32, as are the stop surfaces 56A1 and 56B1 of the respective stop members 56A, 56B. The bottoms 44B of the inner glide bearings 34B and 34C are illustratively flush with the bottom edge 32A of the inner column 32.

Figure 6B:
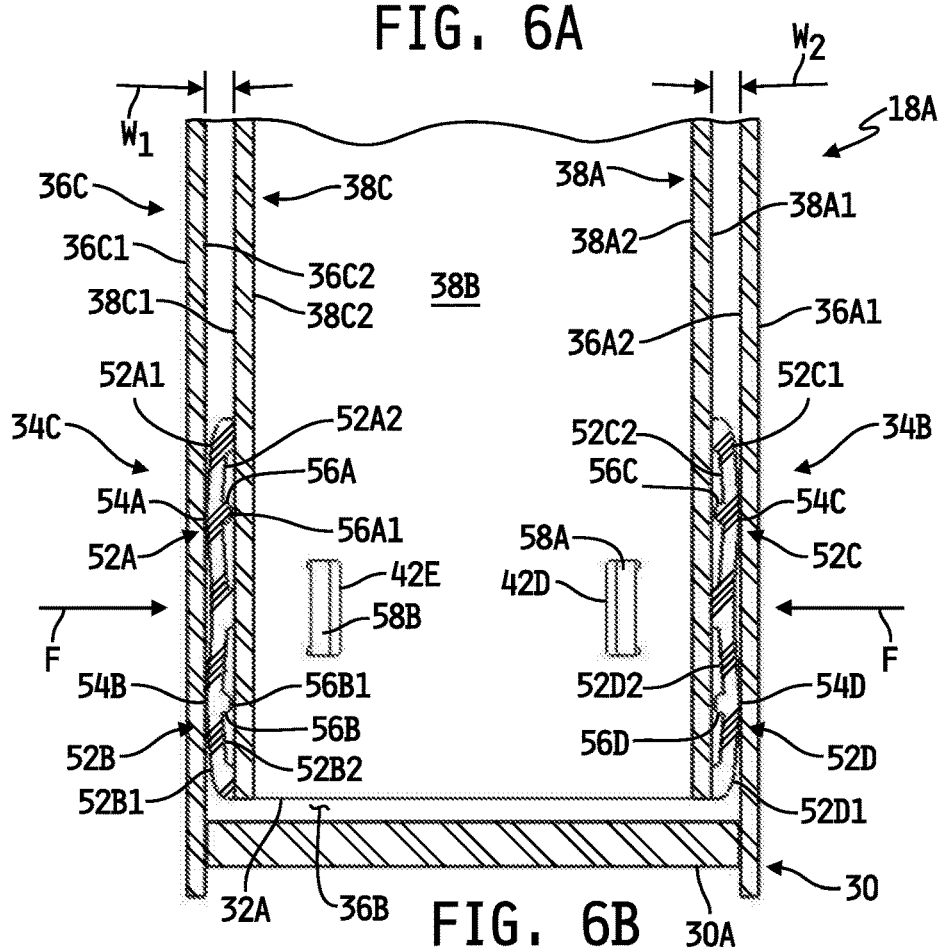
FIG. 6B is a cross-sectional view of the inner and outer column of FIG. 2, as viewed along section lines 6B-6B thereof, showing inner glide bearings disposed within the space between the inner and outer columns and illustrating deflections of the resilient walls of the inner glide bearings in response to a force of the inner surfaces of the outer column acting on the apices thereof, wherein at least the apices of the inner glide bearings provide bearing surfaces to guide relative axial movement between the inner and outer columns.

Referring to FIG. 6B, a cross-sectional view is shown depicting the inner support column 32, with the inner glide bearings 34B and 34C coupled thereto as illustrated in FIG. 6A, axially received within the outer support column 30. The planar side wall 36A of the outer column 30 has opposed outer and inner surfaces 36A1, 36A2 respectively, and the planar side wall 36C of the outer column 30 likewise has opposed outer and inner surfaces 36C1, 36C2. A space of width W1 is defined between the outer surface 38C1 of the side wall 38C of the inner column 32 and the inner surface 36C2 of the side wall 36C of the outer column 30, and a space of width W2 is defined between the outer surface 38A1 of the side wall 38A of the inner column 32 and the inner surface 36A2 of the side wall 36A of the outer column 30. Illustratively, W1=W2=W in the illustrated embodiment, although alternate embodiments are contemplated in which W1≠W2.

As illustrated in FIG. 5B and described above, the each of the wings 48A, 48B of the inner glide bearings 34A-34D has a span S between the plane P1 defined by the contact surfaces 50A, 50B and 50C and a plane P3 defined by the apices 54A and 54B which are co-planar with one another in the uncompressed or non-deflected states of the resilient walls 52A, 52B respectively as illustrated in FIG. 6A, and between the plane P2 defined by the contact surfaces 50D, 50E, 50F and a plane P4 defined by the apices 54C and 54D which are also co-planar with one another in the uncompressed or non-deflected states of the resilient walls 52C, 52D respectively as also illustrated in FIG. 6A. The span S is illustratively selected to be greater than the width W of the space defined between the outer surfaces of the inner column 32 and the respective inner surfaces of the outer column 30 such that the inner glide bearings 34A-34D form an "interference fit" within the space of width W. It will be understood that, as used herein, the term "interference fit" means only that the span S is greater than the width W so that the resilient walls 52A-52D must deflect inwardly in order to accommodate the space between the columns 30, 32, and not that any of the glide bearings secure the columns 30, 32 together in a conventional sense. To the contrary, as described herein, the glide bearings define bearing surfaces bearing surfaces to guide relative axial movement between the inner and outer columns 30, 32.

The resilient walls 52A-52D illustratively deflect or compress inwardly toward the respective outer surfaces of the inner column 32 in order to accommodate the space of width W in response to the lateral force F of the inner surfaces 36A2, 36C2 of the outer column 30 acting against each of the apices 54A-54D of the respective inner glide bearings 34B, 34C as illustrated by example in FIG. 6B. As a result of such compression or deflection, the stop surfaces 56A1 and 56B1 of the stop members 56A and 56B of the inner glide bearing 34C are forced toward the respective outer surface of the inner column 32, as are the corresponding structures of the inner glide bearing 34B as further illustrated in FIG. 6B. The apices 54A, 54B of the inner glide bearing 34C and the apices 54C, 54D of the inner glide bearing 34B remain biased outwardly against the respective inner surfaces of the outer column 30, and relative axial movement between the inner column 32 and the outer column 30 occurs along the apices 54A-54D, i.e., the apices 54A-54D of each of the inner glide bearings 34A-34D ride along the respective inner surfaces of the outer column 30. The stop members 56A-56D act to limit the amount or distance of compression or inward deflection of the resilient walls 52A-52D to the distance between the stop faces of the stop members 56A-56D and the respective outer surfaces of the inner column 32 in the uncompressed states of the inner glide bearings as illustrated by example in FIG. 6A.

In one example embodiment, which should not be considered limiting in any way, the width W=W1=W2 of the space defined between the outer surfaces of the inner column 32 and the inner surfaces of the outer column 30 is 3.0 mm (millimeters)+/−0.2 mm such that the width W may range between 2.8 mm and 3.2 mm the span S defined between the plane P1 and each of the apices 54A, 54B and between the plane P2 and each of the apices 54C, 54D of the inner glide bearings 34A-34D is selected to be 3.2 mm in order to ensure a fit of the inner glide bearings 34A-34D within the space at its maximum width W. The degree or amount of compression or deflection of the resilient walls 52A-52D of the inner glide bearings 34A-34D thus depends upon the actual width W for any particular set of inner and outer columns 32, 30; a greater compression or deflection of the resilient walls 32A-32D will occur for lower values of W and a lesser compression or deflection will occur for greater values of W. In this example embodiment, the distance between the stop faces 56A1, 56B1 of the stop members 56A, 56B and the plane P1, and also between the stop faces 56C1, 56D1 of the stop members 56C, 56D of each of the inner glide bearings is 0.5 mm in the uncompressed or non-deflected states of the inner glide bearings 34A-34C as illustrated by example in FIG. 6A. This leaves a minimum of a 1 mm gap between the stop faces 56A1, 56B1, 56C1, 56D1 of the stop members 56A, 56B, 56C, 56D and the respective outer surfaces of the inner column 32 in the compressed or deflected states of the inner glide bearings 34A-34D with the space between the columns 30, 32 at its minimum width; i.e., with the greatest degree or amount of compression or deflection of the resilient walls 52A-52D. It will be understood that the foregoing numerical values are provided only by way of example and should not be considered limiting in any way, and that this disclosure contemplates alternate embodiments in which the dimensional values of one or more of the components and/or one or more tolerance values are greater or lesser than those provided in the above example.

In the embodiment of the height adjustable supports 18A, 18B illustrated in FIGS. 1-4B and 6A-6B and described in detail above, one example embodiment of the inner glide bearings 34A-34C has been shown and described. Numerous variants of the total number of such inner glide bearings used and/or of the configuration of the inner glide bearings are contemplated by this disclosure. As a first example, the outer and inner support columns 30, 32 may have alternate cross-sectional shapes that may allow for fewer inner glide bearings to be used or that may require more inner glide bearings to be used as compared with the example embodiment illustrated in the attached drawings and described herein. Alternatively or additionally, the specific cross-sectional shapes of the outer and inner support columns 30, 32 to be implemented in a particular application may encourage or necessitate corresponding modifications in the shape(s) of one or more of the inner glide bearings. Referring to FIGS. 5A-5D, for example, in embodiments in which the outer and inner support columns 30, 32 are provided in the form of round or elliptical, single-sided cylinders, either or both of the wings 48A, 48B may be arcuate rather than planar as shown and/or the angle A may be a softer angle to accommodate the rounded single side of the inner column 32, or both of the wings 48A, 48B may be merged into a single arcuate-shaped wing sized with a radius matching that of the outer surface of the inner column 32. In some such embodiments, the total number of inner glide bearings implemented may be reduced to two or three, and in other such embodiments the total number of inner glide bearings implemented may be four or more. In another example embodiment in which the outer and inner columns 30, 32 are provided in the form of elongated structures having triangular cross-sections, only 3 inner glide bearings may be required and the angle A between the wings 48A, 48B may be acute for some or all of the inner glide bearings, may be normal (i.e., 90 degrees) for one of the inner glide bearings and/or may be obtuse for one of the inner glide bearings.

Continuing with other example variants, this disclosure contemplates embodiments in which only portions of the inner glide bearing configuration 34A depicted in FIGS. 5A-5D are used. Referring specifically to FIG. 5C, for example, the imaginary longitudinal line L extends centrally and axially through the corner member 48C as described above, and another imaginary transverse line T extends centrally and laterally across both wings 48A, 48B, thus imaginarily dividing the illustrated inner glide bearing 34A into quarters 34A1, 34A2, 34A3 and 34A4 each having a single resilient wall extending between two contact surfaces. In a first variant, only one of the quarters may be coupled to and about the outer surface of the inner column 32. Implemented with the inner column 32 illustrated in FIGS. 2-4B and 6A-6B for example, a total of 8 such quarters may be coupled to and about the outer surface of the inner column 32; one quarter adjacent to each corner of the inner column. An additional 4 quarters may also be implemented; one each in the middle of a respective wall.

In a second variant, only one of the wings 48A or 48B, i.e., only the two quarters 34A1 and 34A2 or the two quarters 34A3 and 34A4, may be coupled to and about the outer surface of the inner column 32. Implemented with the inner column 32 illustrated in FIGS. 2-4B and 6A-6B for example, a total of 4 such wings 48A, 48B may be coupled to and about the outer surface of the inner column 32; one wing adjacent to each corner of the inner column.

In a third variant, only two of the paired lateral quarters may be implemented, i.e., only the two quarters 34A1 and 34A4 or the two quarters 34A2 and 34A3. In this variant, the paired lateral quarters are coupled together by a corner member 48C1 or 48C2, and therefore 4 such paired lateral quarters may be coupled to the outer surface of the inner column 32 as illustrated in FIGS. 2-4B and 6A-6B and described in detail above. In this variant, however, each inner glide bearing will have only a single resilient wall adjacent each corner rather than the two axially aligned resilient walls as described above. In some such embodiments, an additional one or more rows of the 4 paired lateral quarters may be added in the axial direction along the inner column 32.

In the embodiment of the height adjustable supports 18A, 18B illustrated in FIGS. 1-4B and 6A-6B and described in detail above, each of the inner glide bearings 34A-34C is depicted as including four apices 54A-54D, each of which is linear and each of which extend at least partially across the width of the corresponding outer surface 52A1-52D1 of the respective resilient wall 52A-54D in a direction parallel with the top and bottom 44A, 44B respectively (or perpendicular with the opposed sides 46A, 46B) of the respective inner glide bearing 34A-34D. Such apices are thus oriented perpendicular or normal to the direction of relative axial movement between the inner and outer columns 32, 30 respectively. In still another example variant, one or more the inner glide bearings 34A-34D may be configured such that one or more of the apices 54A-54D extend(s) in a direction that is not parallel with the top and bottom 44A, 44B or perpendicular with the opposed sides 46A, 46B and with the direction of relative axial movement between the inner and outer columns 32, 30 respectively. In one specific example of this variant, one or more of the inner glide bearings 34A-34D may be configured such that one or more of the apices 54A-54D extend(s) at least partially across the length of the corresponding outer surface 52A1-52D1 of the respective resilient wall 52A-54D in a direction perpendicular with the top and bottom 44A, 44B respectively (or parallel with the opposed sides 46A, 46B) of the respective inner glide bearing 34A-34D and thus parallel with the direction of relative axial movement between the inner and outer columns 32, 30 respectively. In other examples of this variant, one or more of the inner glide bearings 34A-34D may be configured such that one or more of the apices 54A-54D extend(s) at least partially across the outer surface 52A1-52D1 of the respective resilient wall 52A-54D at an angle relative to the top and bottom 44A, 44B respectively (or relative to the opposed sides 46A, 46B) of the respective inner glide bearing 34A-34D. It will be further understood that regardless of the orientations of the various apices 54A-54D relative to the top and bottom 44A, 44B or relative to the opposed sides 46A, 46B, further variants are contemplated in which at least one of the apices 54A-54D is at least partially non-linear, i.e., at least one of the apices 54A-54D extends non-linearly at least partially along the outer surface 52A1-52D1 of the respective resilient wall 52A-54D of the respective inner glide bearing 34A-34D. The term "at least partially non-linear," as used herein, should be understood to mean entirely non-linear, partially linear and partially non-linear, entirely piecewise linear, partially piecewise linear and partially non-linear, partially linear and partially piecewise linear and/or any combination thereof.

Other variants will occur to those skilled in the art, and it will be understood that all such other variants are contemplated and are intended to fall within the scope of this disclosure.

Figure 7A:
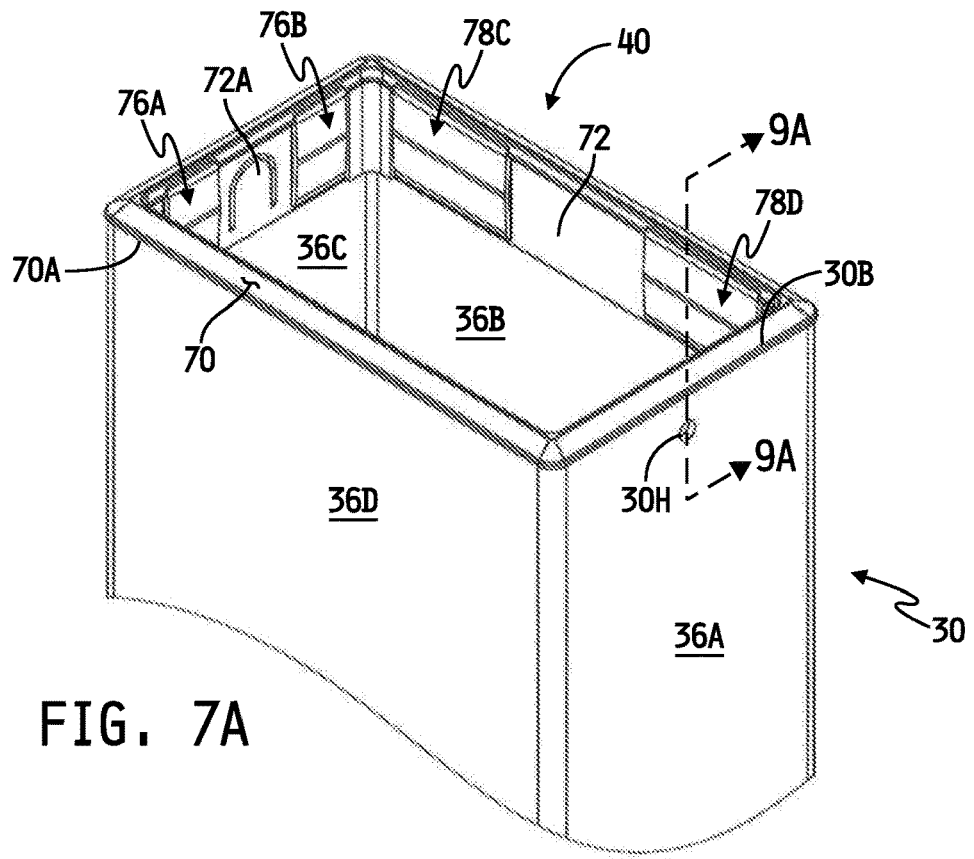
FIG. 7A is a simplified perspective view of the top portion of the outer column of FIGS. 3A and 3B shown in isolation with a glide bushing coupled thereto.
Figure 7B:
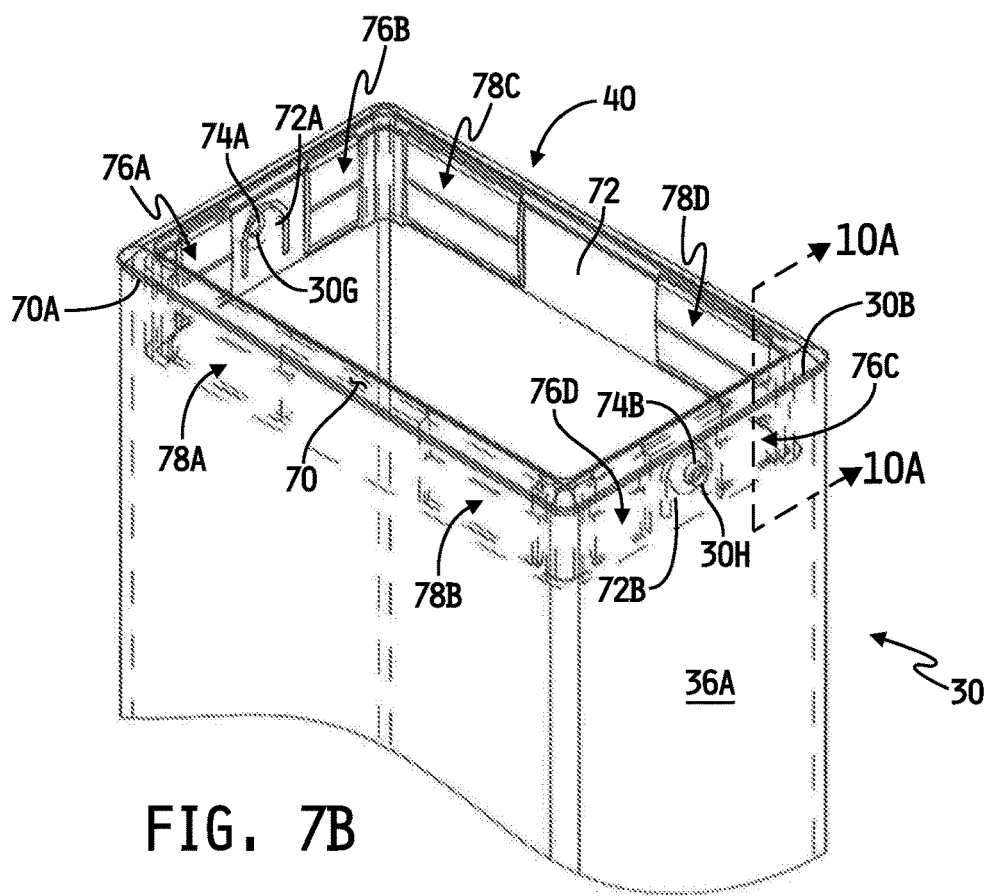
FIG. 7B is a simplified perspective view similar to FIG. 7A and showing some of the features of the glide bushing in dashed-line representation.

Referring now to FIGS. 7A and 7B, perspective views are shown of the outer support column 30 of FIGS. 3A and 3B in isolation (i.e., without the inner column 32 axially received therein) with the glide bushing 40 inserted therein and coupled thereto. The glide bushing 40 illustratively includes a bushing ring 72 having the same general shape as that of the inner cross-sectional periphery of the outer support column 30 so that the bushing ring 72 may be inserted into the top end 30B of the outer column 30. The bushing ring 72 is illustratively provided with a top cap 70 which protrudes beyond the outer surface of the bushing ring 72 to form a lip. The underside of lip of the top cap 70 illustratively defines a contact surface 70A configured complementary to the terminal surface of the top end 30B of the outer column 30. The bushing ring 70 inserted into the top end 30B of the outer column 30 as shown, and is lowered into the outer column 30 until the contact surface 70A comes into contact with the terminal surface of the top end 30B as shown. In embodiments in which the terminal surface of the top end 30B of the outer column 30 is planar, the contact surface 70A of the bushing ring 72 is likewise configured to be planar to maximize contact between the opposed surfaces as illustrated by example in FIGS. 9A-10B. In alternate embodiments in which the terminal surface of the top end 30B of the outer column 30 is non-planar, the contact surface 70A of the bushing ring 70 may be complementarily configured so as to maximize the contact area between the two opposed surfaces.

In the illustrated embodiment, two axially aligned openings 30G, 30H are formed centrally through the walls 36C and 36A respectively of the outer column 32 and spaced apart from the top end 30B of the outer column 30. The bushing ring 72 includes two corresponding protrusions 74A and 74B each sized and positioned to be received within a respective one of the openings 30G, 30H. The bushing ring 72 further illustratively includes two spring tabs 72A, 72B each at least partially surrounding a respective one of the protrusions 74A, 74B, and such spring tabs 72A, 72B are illustratively biased outwardly from a respective wall of the bushing ring 72. As the bushing ring 72 is inserted into the top end 30B of the outer support column 30 and lowered into the outer column 30 until the contact surface 70A of the top cap 70 comes into contact with the terminal surface of the top end 30B as described above, the outward bias of the spring tabs 72A, 74B force the protrusions 74A, 74B into respectively ones of the openings 30G, 30H as illustrated by example in each of FIGS. 9A-9B. In some embodiments, as further illustrated by example in FIG. 9B, the top surface 74C of the protrusions 74A, 74B engages the upper wall of the respective openings 30G, 30H to prevent the bushing ring 72 from sliding upwardly toward the top end 30B of the outer column 30. The combination of the contact surface 70A of the top cap 70 engaging the terminal surface of the top end 30B of the outer column 30 and the protrusions 74A, 74B engaging the respective openings 30G, 30H securely locks the bushing ring 72 to the outer column 30, thereby preventing axial movement of the glide bushing 40 during operation of the height-adjustable supports 18A, 18B. It will be understood that whereas the openings 30G, 30H are depicted in the illustrated embodiment as being circular in cross-section, alternate embodiments are contemplated in which either or both of the openings 30G, 30H, as well as the protrusions 74A, 74B, may have other shapes.

Figure 8:
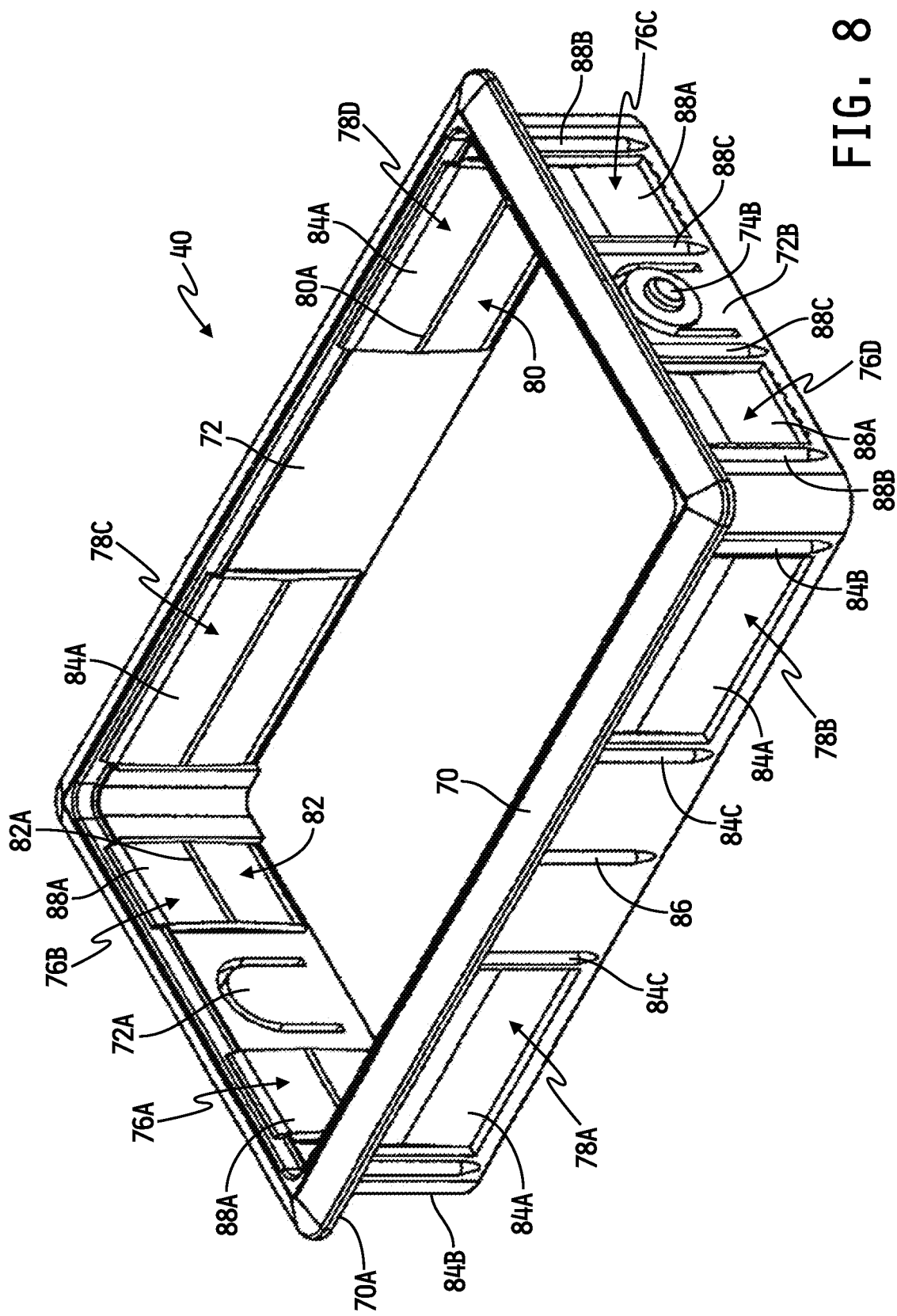
FIG. 8 is a perspective view illustrating an embodiment of the glide bushing of FIGS. 3A, 3B, 7A and 7B.
Figure 9A:
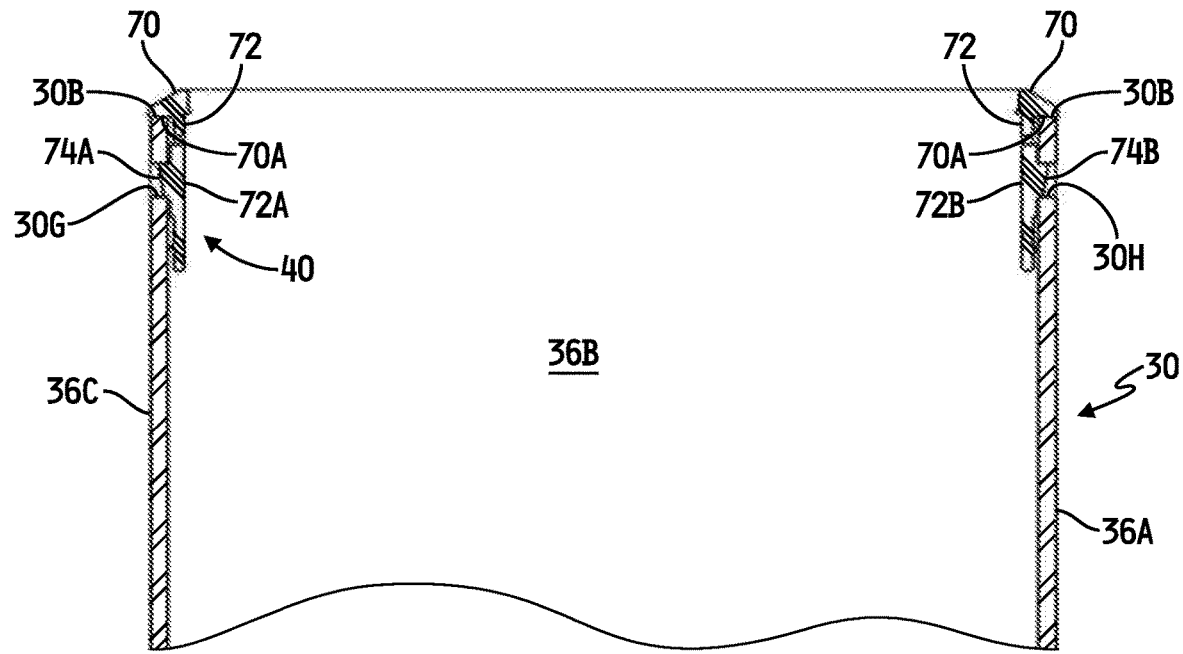
FIG. 9A is a cross-sectional view of the outer column of FIG. 7A, as viewed along section lines 9A-9A thereof, showing an embodiment of a coupling structure for coupling the glide bushing to the outer column.
Figure 9B:
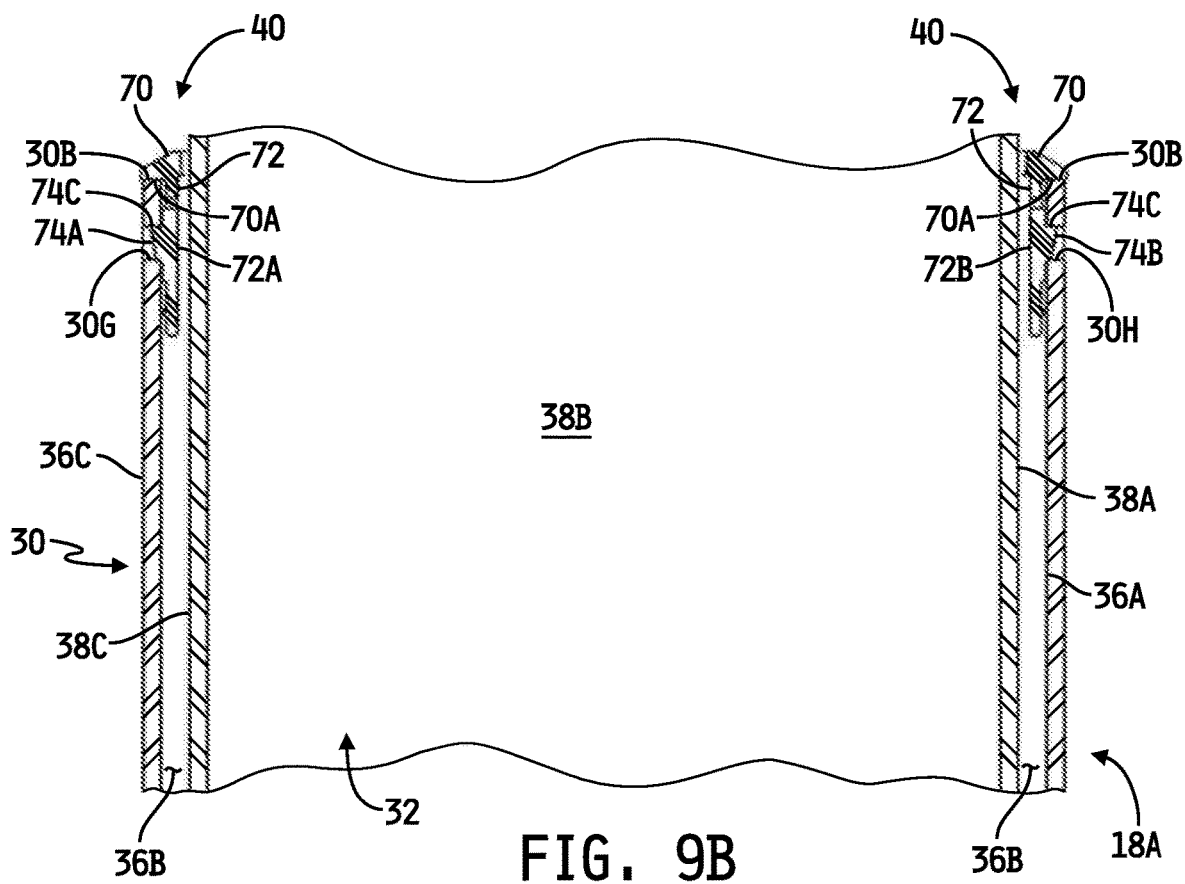
FIG. 9B is a cross-sectional view of the inner and outer columns of FIG. 3B, as viewed along section lines 9B-9B thereof, showing the position of the portion of the glide bushing adjacent to the glide bushing coupling structure relative to the outer surface of the inner column.

Referring now to FIG. 8, an embodiment of the glide bushing 40 illustrated in FIGS. 3A-3B and 7A-7B is shown. As previously describe above, the glide bushing 40 illustratively includes a bushing ring 72 with a top cap 70 affixed to or integral with the bushing ring 72 and a pair of spring tabs 72A, 72B and corresponding protrusions 74A, 74B. The glide bushing 40 further illustratively includes a plurality of outer glide bearings carried by and positioned about the periphery of the bushing ring 72. In the illustrated embodiment, for example, outer glide bearings 76A and 76B are positioned on the bushing ring 72 on either side of the spring tab 72A, two matching outer glide bearings 76C and 76D are positioned on the bushing ring 72 on either side of the spring tab 72B, two relatively larger outer glide bearings 78A and 78B are spaced laterally apart from one another on one of the long sides of the bushing ring 72 and two matching outer glide bearings 78C and 78D are likewise spaced apart laterally from one another on the other long side of the bushing ring 72. Each of the glide bearings 78A-78D includes a resilient wall 84A flanked on either side by respective axially oriented elongated ribs 84B, 84C such that each resilient wall 84A extends between respective pairs of elongated ribs 84B, 84C, and each of the glide bearings 76A-76D likewise includes a resilient wall 88A flanked on either side by respective axially oriented ribs 88B, 88C such that each resilient wall 88A extends between respective pairs of elongated ribs 88B, 88C. Each of the resilient walls 84A has a convex inner surface 80 which peaks at an apex 80A as illustrated with respect to the outer glide bearing 78D, and each of the resilient walls 88A likewise has a convex inner surface 82 which peaks at an apex 82A as illustrated with respect to the outer glide bearing 76B. As further illustrated by example in FIG. 8, the long sides of the bushing ring 72 further illustratively include an extra axially oriented elongated rib 86 positioned centrally between the outer glide bearings 78A and 78B.

The elongated ribs 84B, 84C and 88B, 88C illustrative serve the same purpose relative to the respective resilient walls 84A and 88A of the outer glide bearings 78A-78D and 76A-76D respectively as the contact surfaces 50A-50C and 50D-50F do relative to the respective resilient walls 52A-52D of the inner glide bearings 34A-34C; namely, to serve as contact surfaces against and relative to which respective ones of the resilient walls 84A, 88A are forced to compress or deflect. In this regard, the bushing ring 72 of the glide bushing 40 is illustratively sized to have an outer periphery that is slightly larger than the inner periphery of the outer support column 30 such that a fit is formed between the bushing ring 72 of the glide bushing 40 and the inner surfaces of the respective walls 36A-36D of the outer support column 30. This ensures contact at all times between the elongated ribs 84B, 84C and 88B, 88C and the inner surfaces of the respective walls 36A-36D of the outer support column 30, and in this regard the elongated ribs 84B, 84C and 88B, 88C form the "contact surfaces" against and relative to which respective ones of the resilient walls 84A, 88A are forced to compress or deflect as will be described below with respect to FIGS. 10A and 10B.

Figure 10A:
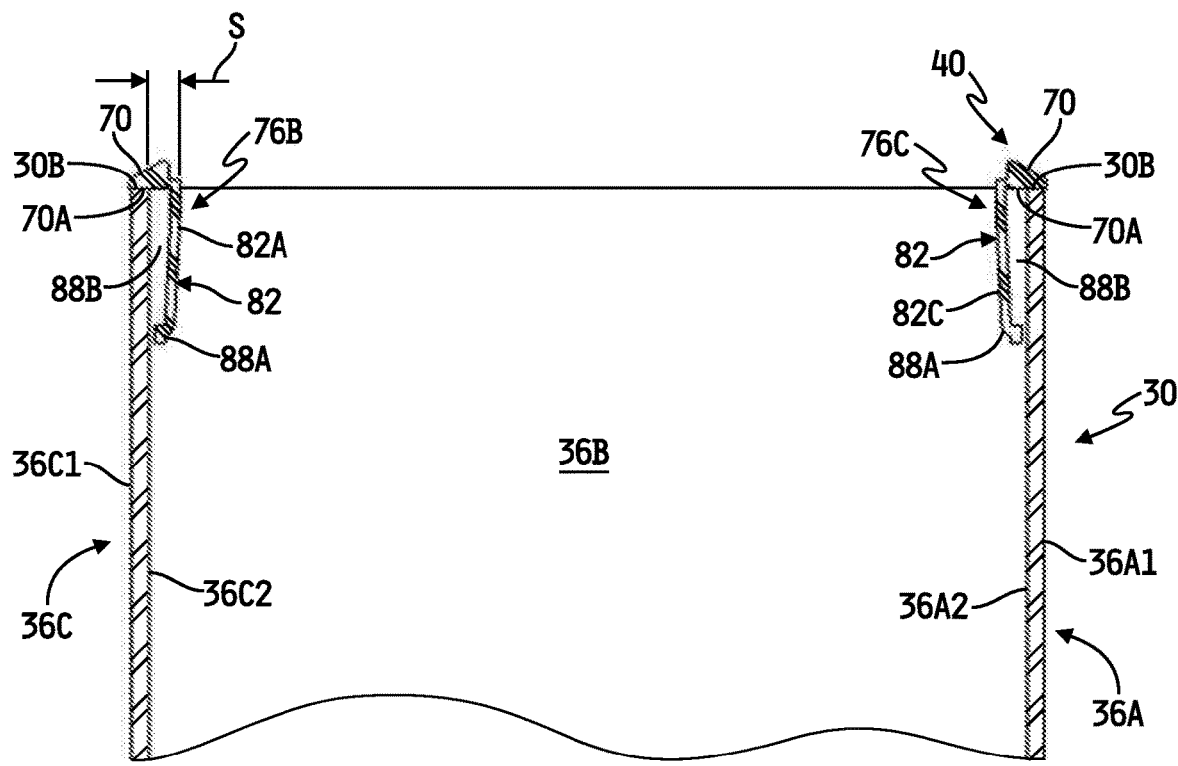
FIG. 10A is a cross-sectional view of the outer column of FIG. 7B, as viewed along section lines 10A-10A thereof, showing an embodiment of two outer glide bearings carried by the glide bushing.
Figure 10B:
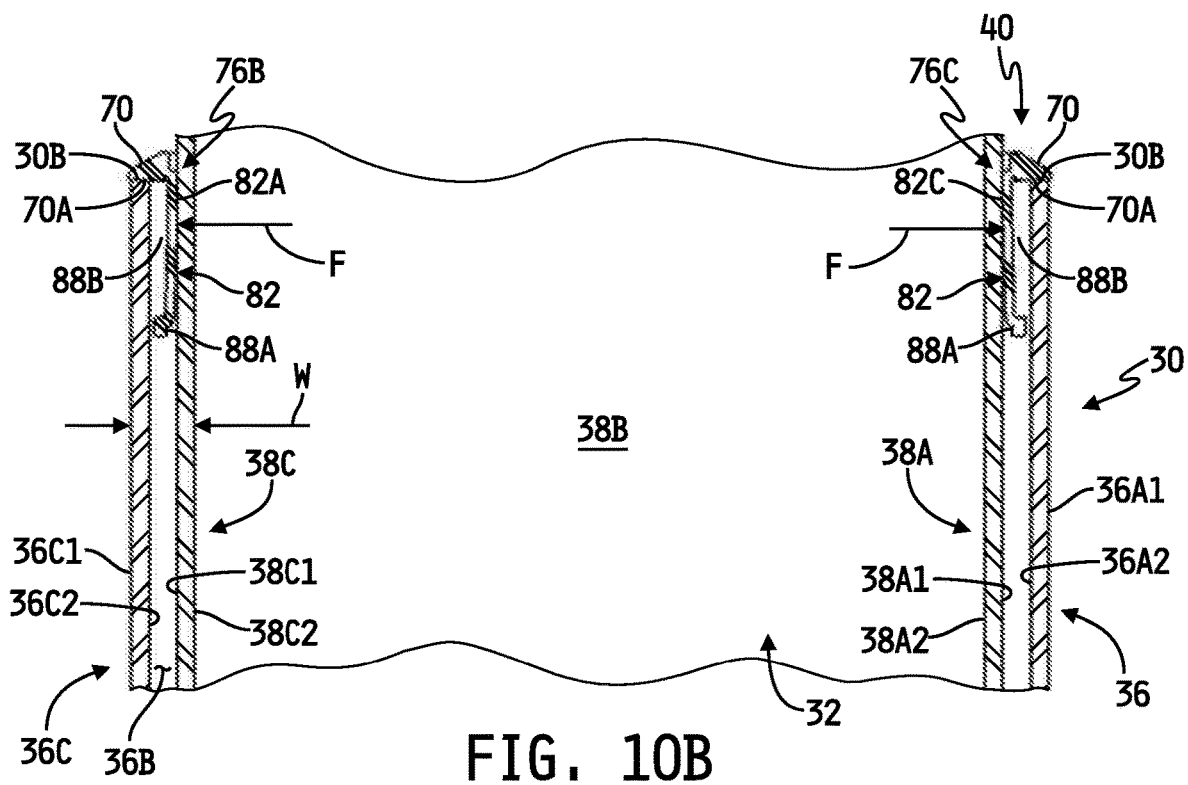
FIG. 10B is a cross-sectional view of the inner and outer columns of FIG. 3B, as viewed along section lines 10B-10B thereof, showing outer glide bearings disposed within the space between the inner and outer columns and illustrating deflections of the resilient walls of the outer glide bearings in response to a force of the outer surfaces of the inner column acting on the apices thereof, wherein at least the apices of the outer glide bearings provide bearing surfaces to guide relative axial movement between the inner and outer columns.

Referring now to FIGS. 10A and 10B, much of the structure and operation of the outer glide bearings 76A-76D and 78A-78A are generally as described above with respect to the inner glide bearings 34A-34D. Referring now to FIG. 10A, for example, a cross-sectional view is shown depicting two of the outer glide bearings 76B and 76C coupled to corresponding sides 36C and 36A respectively of the outer support column 30. Although not specifically depicted in FIG. 10A due to the location of the section line 10A-10A of FIG. 7B, the contact surfaces, i.e., the elongated ribs 88B and 88C, of the outer glide bearings 76B and 76C are in contact with the planar inner surfaces 36C2 and 36A2 respectively of the side walls 36C and 36A of the outer column 30 (note that the elongated ribs 88B are visible through the convexly-shaped space defined between the inner surface of the resilient wall 88A of the outer glide bearing 76B and the inner surface 36C2 of the side wall 36C of the outer support column 30, and through the convexly-shaped space defined between the inner surface of the resilient wall 88A of the outer glide bearing 76C and the inner surface 36A2 of the side wall 36A of the outer support column 30). As further illustrated by example in FIG. 10A, the outer glide bearings 76A-76D and 78A-78D in their uncompressed or non-deflected states define the same span S between the corresponding apices 82A, 80A and the respective inner surfaces of the outer support column 30 as defined between the apices 52A-52D of the uncompressed or non-deflected inner glide bearings 34A-34D and the respective outer surfaces of the inner support column 30.

Referring to FIG. 10B, a cross-sectional view is shown depicting the inner support column 32 axially received within the outer support column 30 with the outer glide bearings 76B and 76C coupled to the outer column 30 as illustrated in FIG. 10A. As described above with respect to FIG. 6B, the span S is illustratively selected to be greater than the width W of the space defined between the outer surfaces of the inner column 32 and the respective inner surfaces of the outer column 30 and, like the inner glide bearings 34A-34D, the outer glide bearings 76A-76D and 78A-78D form an "interference fit" within the space of width W. Also as described above with respect to FIG. 6B, the resilient walls 84A, 88A the outer glide bearings 76A-76D and 78A-78D illustratively deflect or compress inwardly toward the respective inner surfaces of the outer column 30 in order to accommodate the space of width W in response to the lateral force F of the outer surfaces of the inner column 32 acting against each of the apices 80A, 82A of the respective outer glide bearings 76A-76D and 78A-78D as illustrated by example in FIG. 10B. The apices 80A, 82A of the respective outer glide bearings 76A-76D and 78A-78D remain biased inwardly against the respective outer surfaces of the inner column 32, and relative axial movement between the inner column 32 and the outer column 30 occurs along the apices 80A, 82A, i.e., the apices 80A, 82A of each of the outer glide bearings 76A-76D and 78A-78D ride along the respective outer surfaces of the inner column 32.

In the illustrated embodiment, the glide bushing 40 is of uniform construction and is, in one embodiment, formed of a conventional lubrication-free tribo-polymer or tribo-plastic material. Alternatively one or more other conventional bearing materials, such as one or more conventional low-friction materials, may be used to form the glide bushing 40. In alternate embodiments, one or more components of the glide bushing 40 may be formed separately from the others and attached, affixed or otherwise mounted together after formation. In such embodiments, any combination of the components of the glide bushing 40 may be formed together as a single, unitary sub-component, and the remaining component(s) may be formed separately. Such components may then be joined together in any conventional manner to produce the glide bushing 40.

In the embodiment of the height adjustable supports 18A, 18B illustrated in FIGS. 1, 3A-3B and 10A-10B and described in detail above, one example embodiment of the outer glide bearings 76A-76D and 78A-78D has been shown and described. As with the inner glide bearings 34A-34D described above, numerous variants of the total number of such outer glide bearings used and/or of the configuration(s) of the outer glide bearings are contemplated by this disclosure. In this regard, any of the example variants of the inner glide bearings 34A-34D described above may be directly applicable to one or more of the outer glide bearings 76A-76D and 78A-78D and/or to the glide bushing 40. Alternatively or additionally, those skilled in the art will recognize that any modifications to the glide bushing 40 and/or to one or more of the outer glide bearings 76A-76D and 78A-78D necessary for consistency with any of the variants of the inner glide bearings 34A-34D described above may be made and that such any such modifications will be merely a mechanical step for a skilled artisan based at least on the above descriptions of such variants. It will be understood that any such modifications fall within the scope of this disclosure.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A glide bearing for guiding relative axial movement between inner and outer telescoping columns, comprising:
    a first contact surface,
    a second contact surface spaced apart from the first contact surface, the first and second contact surfaces together defining a first non-resilient plane, and
    a first resilient wall extending between the first and second contact surfaces and having an outer convex surface, opposite the first and second contact surfaces, defining a first apex, the glide bearing defining a span between the first non-resilient plane and the first apex that is greater than a width of a space defined between the inner and outer columns, the glide bearing configured to be disposed within the space with the first and second contact surfaces contacting one of the inner and outer columns, with the first apex contacting the other of the inner and outer columns and with the first resilient wall deflecting inwardly toward the first non-resilient plane defined by the first and second contact surfaces to accommodate the space in response to a force of the other of the inner and outer columns acting against the first apex,
    wherein at least the first apex of the outer convex surface forms a bearing surface to guide relative axial movement between inner and outer telescoping columns.

2. The glide bearing of claim 1, further comprising means for coupling the glide bearing to the one of the inner and outer columns.

3. The glide bearing of claim 1, further comprising a first stop member extending from an inner surface of the first resilient wall, the first stop member having a first stop surface facing toward and spaced apart from the first non-resilient plane such that the first stop surface is positioned between the first non-resilient plane and the inner surface of the first resilient wall, the first stop member configured to limit an amount of inward deflection of the first resilient wall.

4. The glide bearing of claim 1, wherein the one of the inner and outer columns is the inner column and the other of the inner and outer columns is the outer column,
   wherein the glide bearing is configured to be disposed within the space with the first and second contact surfaces contacting an outer surface of the inner column, with the first apex contacting the inner surface of the outer column and with the first resilient wall deflecting inwardly toward the first non-resilient plane to accommodate the space in response to the force of the inner surface of the outer column acting against the first apex, and
   further comprising means for coupling the glide bearing to the inner column.

5. The glide bearing of claim 4, further comprising:
   a third contact surface spaced apart from the second contact surface such that the first, second and third contact surfaces together define the first non-resilient plane, the second contact surface positioned between the first and the third contact surfaces, and
   a second resilient wall extending between the second and third contact surfaces and having an outer convex surface, opposite the second and third contact surfaces, defining a second apex, the glide bearing defining the span between the first non-resilient plane and the second apex, the glide bearing further configured to be disposed within the space with the third contact surface contacting the outer surface of the inner column, with the second apex contacting the inner surface of the outer column and with the second resilient wall deflecting inwardly toward the first non-resilient plane to accommodate the space in response to the force of the inner surface of the outer column acting against the second apex
   wherein at least the first and second apices together form the bearing surface.

6. The glide bearing of claim 5, wherein the first, second and third contact surfaces are collinear with one another.

7. The glide bearing of claim 5, further comprising a second stop member extending from an inner surface of the second resilient wall, the second stop member having a second stop surface facing toward and spaced apart from the first non-resilient plane such that the second stop surface is positioned between the first non-resilient plane and the inner surface of the second resilient wall, the second stop member configured to limit an amount of inward deflection of the second resilient wall.

8. The glide bearing of claim 5, further comprising:
   a fourth contact surface,
   a fifth contact surface spaced apart from the fourth contact surface,
   a sixth contact surface spaced part from the fifth contact surface such that the fourth, fifth and sixth contact surfaces together define a second plane different from the first non-resilient plane, the fifth contact surface positioned between the fourth and the sixth contact surfaces,
   a third resilient wall extending between the fourth and fifth contact surfaces and having an outer convex surface, opposite the fourth and fifth contact surfaces, defining a third apex, the glide bearing defining the span between the second plane and the third apex, the glide bearing further configured to be disposed within the space with the fourth and fifth contact surfaces contacting the outer surface of the inner column, with the third apex contacting the inner surface of the outer column and with the third resilient wall deflecting inwardly toward the second plane to accommodate the space in response to the force of the inner surface of the outer column acting against the third apex, and
   a fourth resilient wall extending between the fifth and sixth contact surfaces and having an outer convex surface, opposite the fifth and sixth contact surfaces, defining a fourth apex, the glide bearing defining the span between the second plane and the fourth apex, the glide bearing further configured to be disposed within the space with the sixth contact surface contacting the outer surface of the inner column, with the fourth apex contacting the inner surface of the outer column and with the fourth resilient wall deflecting inwardly toward the second plane to accommodate the space in response to the force of the inner surface of the outer column acting against the fourth apex,
   wherein at least the first, second, third and fourth apices together form the bearing surface.

9. The glide bearing of claim 8, wherein the fourth, fifth and sixth contact surfaces are collinear with one another.

10. The glide bearing of claim 8, wherein the first non-resilient plane and the second plane define an angle therebetween, the angle being one of an acute angle, an obtuse angle and a right angle.

11. The glide bearing of claim 8, wherein the first non-resilient plane and the second plane define a right angle therebetween such that the outer convex surfaces of the first and third resilient walls define a first outer corner of the glide member and such that the outer convex surfaces of the second and fourth resilient walls define a second outer corner of the glide member, and wherein the first and second outer corners are collinear.

12. The glide bearing of claim 8, wherein at least the outer convex surfaces of the first, second, third and fourth resilient walls are formed of a tribo-polymer material.

13. The glide bearing of claim 8, further comprising:
   first means for coupling a combination of the first, second and third contact surfaces and the first and second resilient walls to a first portion of the inner column, and
   second means for coupling a combination of the fourth, fifth and sixth contact surfaces and the third and fourth resilient walls to a second portion of the inner column different from the first portion.

14. The glide bearing of claim 13, wherein the first contact surface, the second contact surface, the third contact surface, the fourth contact surface, the fifth contact surface, the sixth contact surface, the first resilient wall, the second resilient wall, the third resilient wall, the fourth resilient wall, the first means for coupling a combination of the first, second and third contact surfaces and the first and second resilient walls to a first portion of the inner column and the second means for coupling a combination of the fourth, fifth and sixth contact surfaces and the third and fourth resilient walls to a second portion of the inner column different from the first portion are together of unitary construction.

15. The glide bearing of claim 8, further comprising:
   a third stop member extending from an inner surface of the third resilient wall, the third stop member having a third stop surface facing toward and spaced apart from the second plane such that the third stop surface is positioned between the second plane and the inner surface of the third resilient wall, the third stop member configured to limit an amount of inward deflection of the third resilient wall, and a fourth stop member extending from an inner surface of the fourth resilient wall, the fourth stop member having a fourth stop surface facing toward and spaced apart from the second plane such that the fourth stop surface is positioned between the second plane and the inner surface of the fourth resilient wall, the fourth stop member configured to limit an amount of inward deflection of the fourth resilient wall.

16. A glide bearing arrangement for telescoping columns, comprising:

an inner elongated support column having an outer surface, an outer elongated support column having an inner surface, the outer column axially receiving the inner column therein with a space defined about the inner column between the outer surface of the inner column and the inner surface of the outer column, and a plurality of inner glide bearings mounted to and about the inner column adjacent to or spaced apart from one end thereof, each inner glide bearing including:

a first contact surface in contact with the outer surface of the inner column, a second contact surface in contact with the outer surface of the inner column, the second contact surface spaced longitudinally apart from the first contact surface relative to the outer surface of the inner column, and a first resilient wall extending between the first and second contact surfaces and having an outer convex surface, opposite the first and second contact surfaces, defining a first apex, the inner glide bearing defining a span between the first apex and a first non-resilient plane defined by the first and second contact surfaces that is greater than a width of the space defined between the inner and outer columns, the inner glide bearing disposed within the space with the first and second contact surfaces contacting the outer surface of the inner column, with the first apex contacting the inner surface of the outer column and with the first resilient wall deflecting inwardly toward the outer surface of the inner column against the first non-resilient plane defined by the first and second contact surfaces to accommodate the space as a force of the inner surface of the outer column acts against the first apex, wherein at least the first apex of the outer convex surface of the inner glide bearing forms a first bearing surface to guide relative axial movement between inner and outer telescoping columns.

17. The glide bearing arrangement of claim 16, wherein one or more of the plurality of inner glide bearings includes means for coupling the inner glide bearing to the inner column.

18. The glide bearing arrangement of claim 16, wherein the inner elongated support column has a plurality of sides and a first polygonal cross-section, and the outer elongated support column has a plurality of sides matching that of the inner elongated support column and a second polygonal cross-section matching, but larger than, that of the first polygonal cross-section such that each of the plurality of matching sides of the inner and outer support columns defines the space therebetween, and wherein the first contact surfaces of each of the plurality of inner glide bearings contacts a different one of the plurality of sides of the inner support column.

19. The glide bearing arrangement of claim 16, wherein the inner and outer elongated support columns each have lower and upper ends, and wherein each of the plurality of inner glide bearings is mounted to and about the inner column adjacent to or spaced apart from the lower end thereof, and wherein the glide bearing arrangement further comprises a plurality of outer glide bearings mounted to and about the outer column adjacent to or spaced apart from the upper end thereof, each of the outer glide bearings including:

a first contact surface in contact with the inner surface of the outer column, a second contact surface in contact with the inner surface of the outer column, the second contact surface of the outer glide bearing spaced laterally apart from the first contact surface of the outer glide bearing relative to the inner surface of the outer column, and a second resilient wall extending between the first and second contact surfaces of the outer glide bearing and having an outer convex surface, opposite the first and second contact surfaces thereof, defining a second apex, the outer glide bearing defining a span between the second apex thereof and a second plane defined by the first and second contact surfaces of the outer glide bearing that is greater than a width of the space defined between the inner and outer columns, the outer glide bearing disposed within the space with the first and second contact surfaces of the outer glide bearing contacting the inner surface of the outer column, with the second apex of the outer glide bearing contacting the outer surface of the inner column and with the second resilient wall of the outer glide bearing deflecting inwardly toward the inner surface of the outer column to accommodate the space as a force of the outer surface of the inner column acts against the apex of the second resilient wall of the outer glide bearing, wherein at least the second apex of the outer convex surface of the outer glide bearing forms a second bearing surface to guide relative axial movement between inner and outer telescoping columns.

20. The glide bearing arrangement of claim 19, further comprising a ring surrounding the inner surface of the outer column and coupled to the outer column, wherein each of the plurality of outer glide bearings is carried by the ring.

21. The glide bearing arrangement of claim 20, further comprising means for coupling the ring to the outer column.

22. The glide bearing arrangement of claim 20, wherein the ring comprises a cap surrounding a top end of the ring, the cap including an underside configured complementarily to a top edge of the outer column, the ring configured to be inserted into the outer column with the underside of the cap supported by the top edge of the outer column.

23. The glide bearing arrangement of claim 22, wherein the ring, the cap, each of the plurality of outer glide bearings and the means for coupling the ring to the outer column are together of unitary construction.

24. The glide bearing arrangement of claim 19, wherein at least the outer convex surfaces of the first and second resilient walls are formed of a tribo-polymer material.

25. A glide bearing for guiding relative axial movement between inner and outer telescoping columns, comprising:

a first contact surface, a second contact surface spaced apart from the first contact surface, the first and second contact surfaces together defining a first plane, a first resilient wall extending between the first and second contact surfaces and having an outer convex surface, opposite the first and second contact surfaces, defining a first apex, the glide bearing defining a span between the first plane and the first apex that is greater than a width of a space defined between the inner and outer columns, the glide bearing configured to be disposed within the space with the first and second contact surfaces contacting one of the inner and outer columns, with the first apex contacting the other of the inner and outer columns and with the first resilient wall deflecting inwardly toward the first plane to accommodate the space in response to a force of the other of the inner and outer columns acting against the first apex, a third contact surface, a fourth contact surface spaced apart from the third contact surface, the third and fourth contact surfaces together defining a second plane, the first and second planes non-coplanar and non-parallel with one another, and a second resilient wall extending between the third and fourth contact surfaces and having an outer convex surface, opposite the third and fourth contact surfaces, defining a second apex, the glide bearing defining a second span between the second plane and the second apex that is greater than the width of a space defined between the inner and outer columns, the glide bearing configured to be disposed within the space with the third and fourth contact surfaces contacting the one of the inner and outer columns, with the second apex contacting the other of the inner and outer columns and with the second resilient wall deflecting inwardly toward the second plane to accommodate the space in response to a force of the other of the inner and outer columns acting against the second apex, wherein at least the first and second apices of the outer convex surfaces of the respective first and second resilient walls form bearing surfaces to guide relative axial movement between inner and outer telescoping columns.

26. The glide bearing of claim 25, wherein the first plane and the second plane define an angle therebetween, the angle being one of an acute angle, an obtuse angle and a right angle.

27. The glide bearing of claim 25, wherein the first plane and the second plane define a right angle therebetween such that the outer convex surfaces of the first and second resilient walls define an outer corner of the glide member.

* * * * *